United States Patent
Yankoski et al.

(10) Patent No.: US 12,537,268 B2
(45) Date of Patent: Jan. 27, 2026

(54) BATTERY MODULE HAVING A LAMINATED BUSBAR ASSEMBLY

(71) Applicant: LG Energy Solution, Ltd., Seoul (KR)

(72) Inventors: Edward P. Yankoski, West Branch, MI (US); Heekook Yang, Sterling Heights, MI (US); Sanjeev Porchelvan, Shelby Township, MI (US); Atish Bharat Dahitule, Troy, MI (US)

(73) Assignee: LG Energy Solution, Ltd., Seoul (KR)

( * ) Notice: Subject to any disclaimer, the term of this patent is extended or adjusted under 35 U.S.C. 154(b) by 691 days.

(21) Appl. No.: 17/539,755

(22) Filed: Dec. 1, 2021

(65) Prior Publication Data

US 2023/0170584 A1    Jun. 1, 2023

(51) Int. Cl.
*H01M 50/526* (2021.01)
*H01M 10/48* (2006.01)
*H01M 10/643* (2014.01)
*H01M 50/213* (2021.01)
*H01M 50/503* (2021.01)
(Continued)

(52) U.S. Cl.
CPC ....... *H01M 50/526* (2021.01); *H01M 10/482* (2013.01); *H01M 10/643* (2015.04); *H01M 50/213* (2021.01); *H01M 50/503* (2021.01); *H01M 50/507* (2021.01); *H01M 50/509* (2021.01); *H01M 50/534* (2021.01); *H01M 50/548* (2021.01)

(58) Field of Classification Search
CPC .......................... H01M 50/526; H01M 50/548
See application file for complete search history.

(56) References Cited

U.S. PATENT DOCUMENTS

| | | |
|---|---|---|
| 2015/0340157 A1 | 11/2015 | Wen et al. |
| 2016/0111760 A1 | 4/2016 | Arai |

(Continued)

FOREIGN PATENT DOCUMENTS

| | | |
|---|---|---|
| CN | 205248354 U | 5/2016 |
| CN | 211670261 U | 10/2020 |

(Continued)

OTHER PUBLICATIONS

International Search Report for Application No. PCT/IB2022/062119 dated Apr. 7, 2023.

*Primary Examiner* — Nicholas A Smith
*Assistant Examiner* — Zackary Richard Cochenour
(74) *Attorney, Agent, or Firm* — Bookoff McAndrews, PLLC

(57) ABSTRACT

A battery module having first and second cylindrical battery cells is provided. The module includes a laminated busbar assembly having a bottom isolation layer, a first busbar layer, an intermediate isolation layer, and a second busbar layer. The bottom isolation layer has a first aperture that receives the positive electrode of the first battery cell therethrough and exposes a portion of the negative electrode of the first battery cell. The first busbar layer has a first aperture that receives the positive electrode of the first battery cell therethrough. A portion of the first busbar layer electrically contacts the negative electrode of the first battery cell. The intermediate isolation layer has a first aperture that receives the positive electrode of the first battery cell therethrough. The second busbar layer electrically contacts the positive electrode of the first battery cell.

19 Claims, 25 Drawing Sheets

(51) Int. Cl.
    *H01M 50/507*    (2021.01)
    *H01M 50/509*    (2021.01)
    *H01M 50/534*    (2021.01)
    *H01M 50/548*    (2021.01)

(56) References Cited

U.S. PATENT DOCUMENTS

| | | | |
|---|---|---|---|
| 2018/0083251 A1* | 3/2018 | Newman | B60L 3/04 |
| 2018/0190960 A1* | 7/2018 | Harris | H01M 50/509 |
| 2018/0309281 A1 | 10/2018 | Ichikawa et al. | |
| 2018/0375270 A1 | 12/2018 | Jiang | |
| 2019/0319232 A1* | 10/2019 | Ryu | H01M 10/613 |
| 2020/0136119 A1 | 4/2020 | Weinberger et al. | |
| 2020/0203941 A1 | 6/2020 | Ing et al. | |
| 2020/0259153 A1* | 8/2020 | Capati | H01M 50/213 |
| 2020/0343516 A1 | 10/2020 | Harris et al. | |
| 2021/0159571 A1 | 5/2021 | Geshi et al. | |
| 2021/0257704 A1* | 8/2021 | Sawada | H01M 50/213 |
| 2022/0102954 A1 | 3/2022 | Baseri et al. | |
| 2022/0158307 A1* | 5/2022 | Frick | H01M 10/613 |
| 2022/0263169 A1 | 8/2022 | Ryu et al. | |
| 2023/0033985 A1 | 2/2023 | Harris et al. | |
| 2023/0318277 A1 | 10/2023 | Baseri et al. | |
| 2024/0274903 A1 | 8/2024 | Harris et al. | |

FOREIGN PATENT DOCUMENTS

| | | |
|---|---|---|
| JP | 2015053205 A | 3/2015 |
| JP | 2016081836 A | 5/2016 |
| JP | 2019522320 A | 8/2019 |
| JP | 2022055312 A | 4/2022 |
| JP | 2022153372 A | 10/2022 |
| KR | 20180106688 A | 10/2018 |
| WO | 2019182117 A1 | 9/2019 |
| WO | 2019194053 A1 | 10/2019 |

* cited by examiner

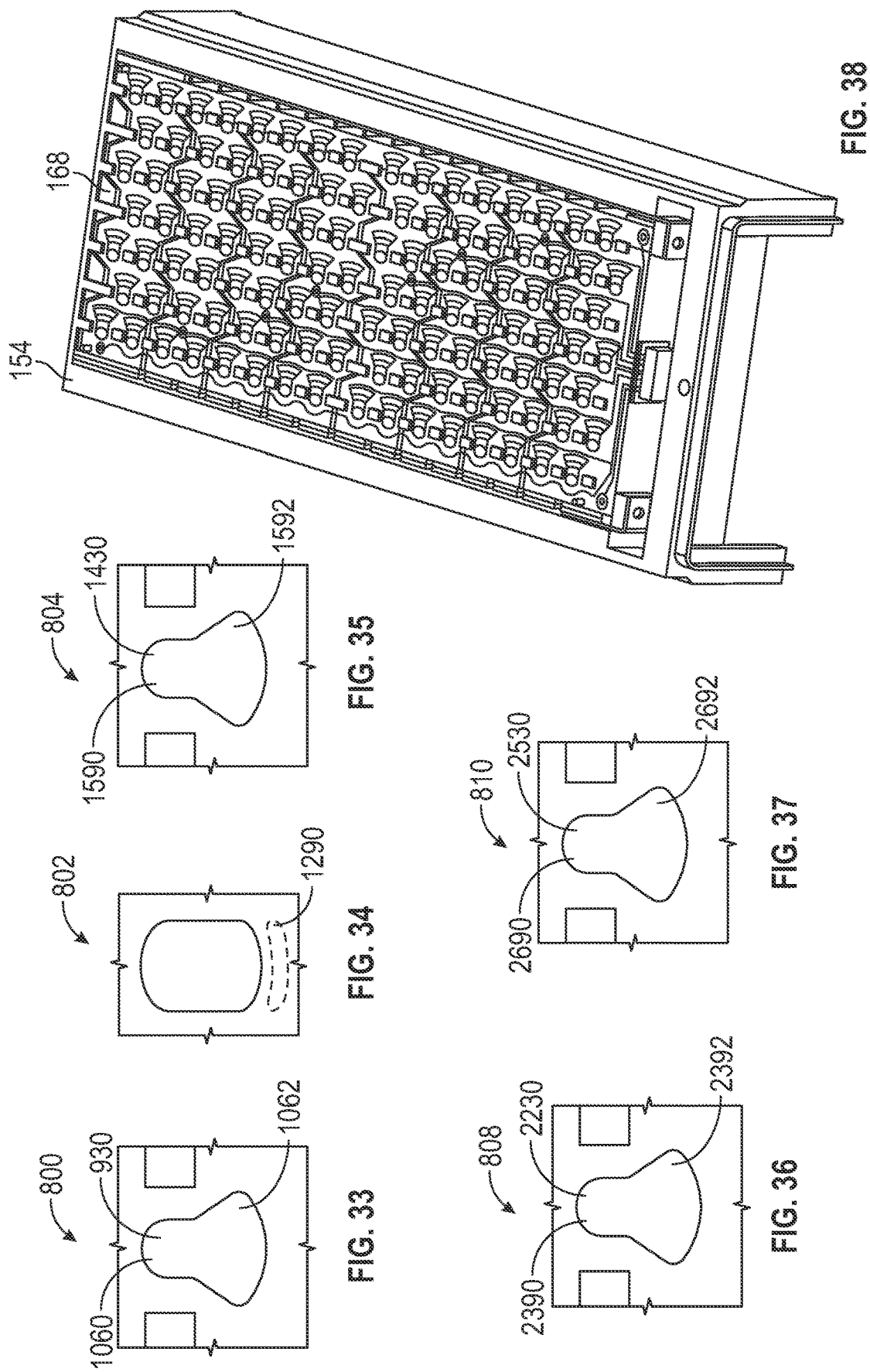

US 12,537,268 B2

BATTERY MODULE HAVING A LAMINATED BUSBAR ASSEMBLY

BACKGROUND

Small battery modules are often manufactured using a wire bonding process with aluminum busbars to generate multiple series and parallel configurations of cylindrical battery cells. However, often the packaging of the cylindrical battery cells in the battery module needs to be modified to obtain a desired series or parallel electrical configuration. Further, the battery modules often have a relatively high height profile.

The inventors herein have recognized a need for an improved battery module that utilizes a laminated busbar assembly that has a relatively low height profile design and that provides both series and parallel electrical configurations of cylindrical battery cells without having to modify the packaging of the battery cells.

SUMMARY

A battery module in accordance with an exemplary embodiment is provided. The battery module includes a first cylindrical battery cell having a positive electrode and a negative electrode. The battery module further includes a laminated busbar assembly having a bottom isolation layer, a first busbar layer, an intermediate isolation layer, and a second busbar layer. The first busbar layer is coupled to and between the bottom isolation layer and the intermediate isolation layer. The intermediate isolation layer is coupled to and between the first busbar layer and the second busbar layer. The bottom isolation layer has a first aperture extending therethrough that is sized and shaped to receive the positive electrode of the first cylindrical battery cell therethrough and to expose a portion of the negative electrode of the first cylindrical battery cell. The first busbar layer has a first aperture extending therethrough that is sized and shaped to receive the positive electrode of the first cylindrical battery cell therethrough. A portion of the first busbar layer proximate to the first aperture thereof is disposed against and electrically contacts the negative electrode of the first cylindrical battery cell. The intermediate isolation layer has a first aperture extending therethrough being sized and shaped to receive the positive electrode of the first cylindrical battery cell therethrough. The second busbar layer is disposed against and electrically contacts the positive electrode of the first cylindrical battery cell.

BRIEF DESCRIPTION OF THE DRAWINGS

FIG. 33 is an enlarged view of a portion of the bottom isolation layer of FIG. 23;

FIG. 34 is an enlarged view of a portion of the first busbar layer of FIG. 26;

FIG. 35 is an enlarged view of a portion of the intermediate isolation layer of FIG. 27;

FIG. 36 is an enlarged view of a portion of the top isolation layer of FIG. 30;

FIG. 37 is an enlarged view of a portion of the sensor layer of FIG. 31;

FIG. 38 is an isometric view of a second retention housing utilized in the battery module of FIG. 1 holding a plurality of cylindrical battery cells, first and second retaining plates, and a laminated busbar assembly therein;

DETAILED DESCRIPTION

Figure 1:
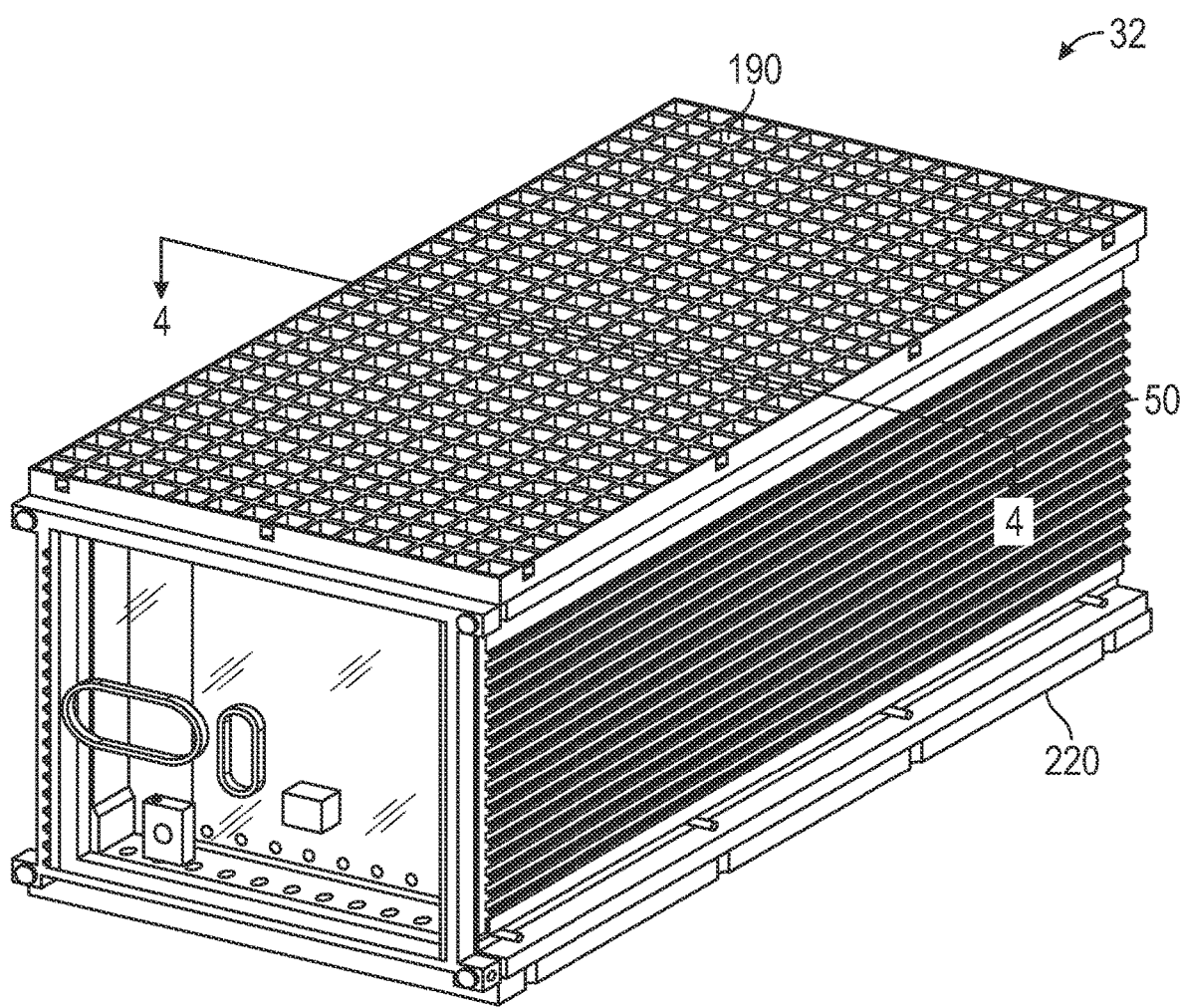
FIG. 1 is a schematic of a battery module in accordance with an exemplary embodiment.

Referring to FIGS. 1-15, a battery module 32 in accordance with an exemplary embodiment is provided. Referring to FIGS. 3 and 4, the battery module 32 includes a battery cell retention frame 50, a first retention housing 54, a plurality of cylindrical battery cells 56, retaining plates 60, 62 (shown in FIG. 8), a laminated busbar assembly 68, a second retention housing 154, a plurality of cylindrical battery cells 156, retaining plates 160, 162 (shown in FIG. 31), a laminated busbar assembly 168, a first outer plate 190, bolts 191, 192, 193, 194, 195, 196, 197, 198, 199, a second outer plate 220, bolts 221, 222, 223, 224, 225, 226, 227, 228, 229, a circuit board 240, an electrical busbar 242, and a cover plate 246.

Battery Cell Retention Frame

Figure 4:
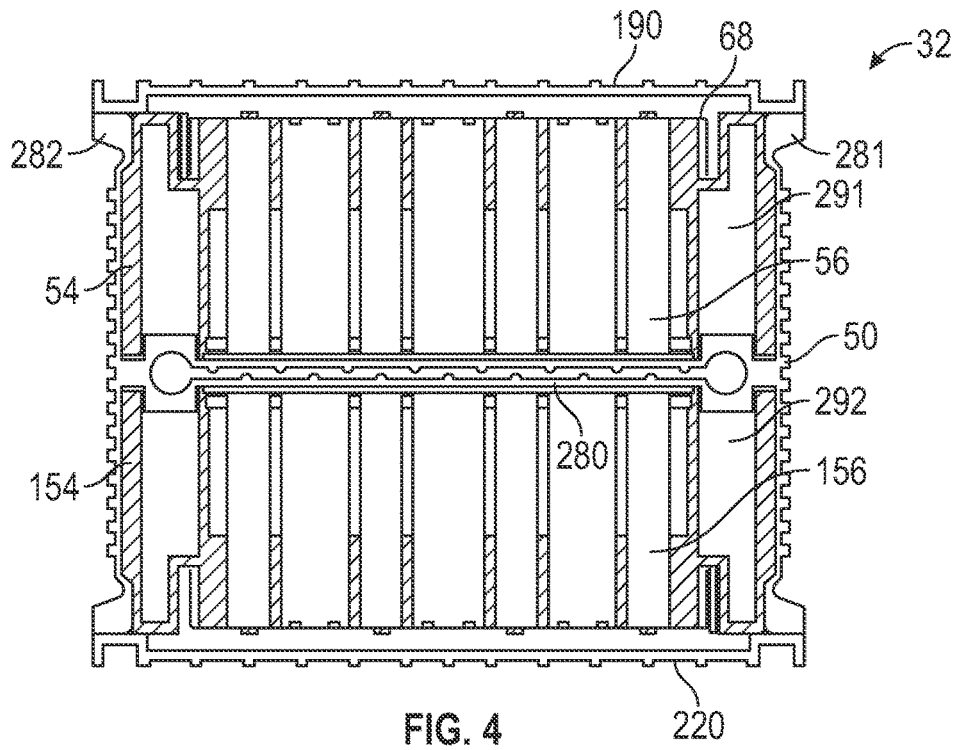
FIG. 4 is a cross-sectional view of the battery module of FIG. 3 taken along lines 4-4 in FIG. 1.
Figure 5:
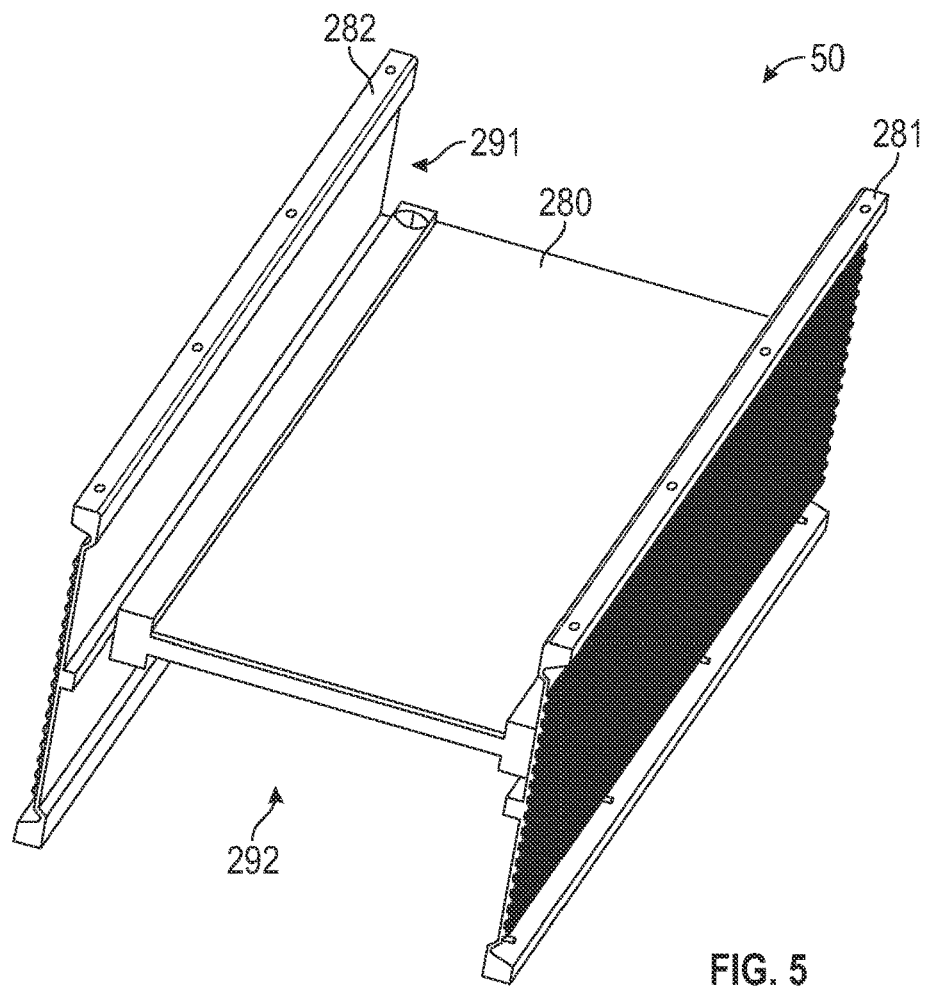
FIG. 5 is an isometric view of a battery cell retention frame utilized in the battery module of FIG. 1.
Figure 6:
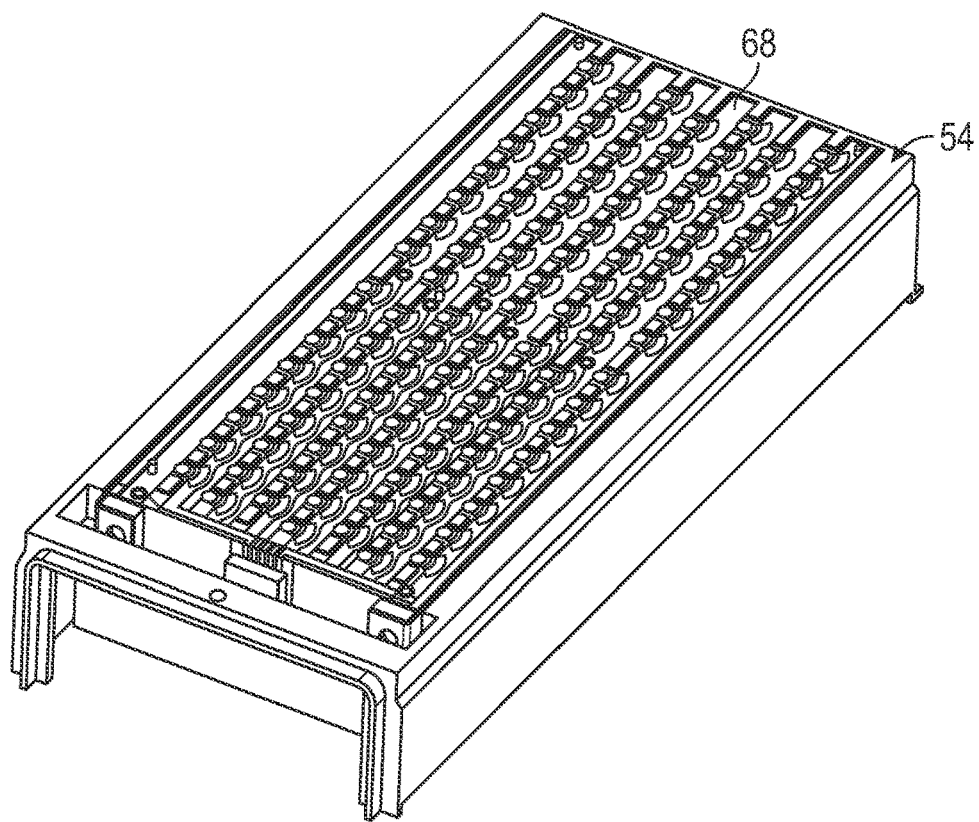
FIG. 6 is an isometric view of the first retention housing utilized in the battery module of FIG. 1 holding a plurality of cylindrical battery cells, first and second retaining plates, and a laminated busbar assembly therein.

Referring to FIGS. 4 and 5, the battery cell retention frame 50 is provided to hold and to cool the plurality of cylindrical battery cells 56 and the plurality of cylindrical battery cells 156 thereon. The battery cell retention frame 50 includes a central cooling portion 280, a first exterior plate 281, and a second exterior plate 282. The frame 50 can hold and cool the plurality of cylindrical battery cells 56, 156 on opposite sides of the central cooling portion 280 while supporting and protecting the battery cells 56, 156 with the first and second exterior plates 141, 142. In particular, the central cooling portion 280 receives a cooling fluid therethrough that cools the plurality of cylindrical battery cells 56 and the plurality of cylindrical battery cells 156 thereon. In an exemplary embodiment, the first exterior plate 281, and the second exterior plate 282 are constructed of a metal such as aluminum for example. In the exemplary embodiment, the central cooling portion 280 includes an aluminum housing with first and second thermally conductive layers disposed thereon that are constructed of a thermally conductive material that is not electrically conductive that contact the battery cells 56, 156.

Regions

The first and second exterior plates 141, 142 and the central cooling portion 280 define a first region 291 for receiving the plurality of cylindrical battery cells 56 therein. Further, the first and second exterior plates 141, 142 and the central cooling portion 280 define a second region 292 for receiving the plurality of cylindrical battery cells 156 therein.

First Retention Housing

Figure 12:
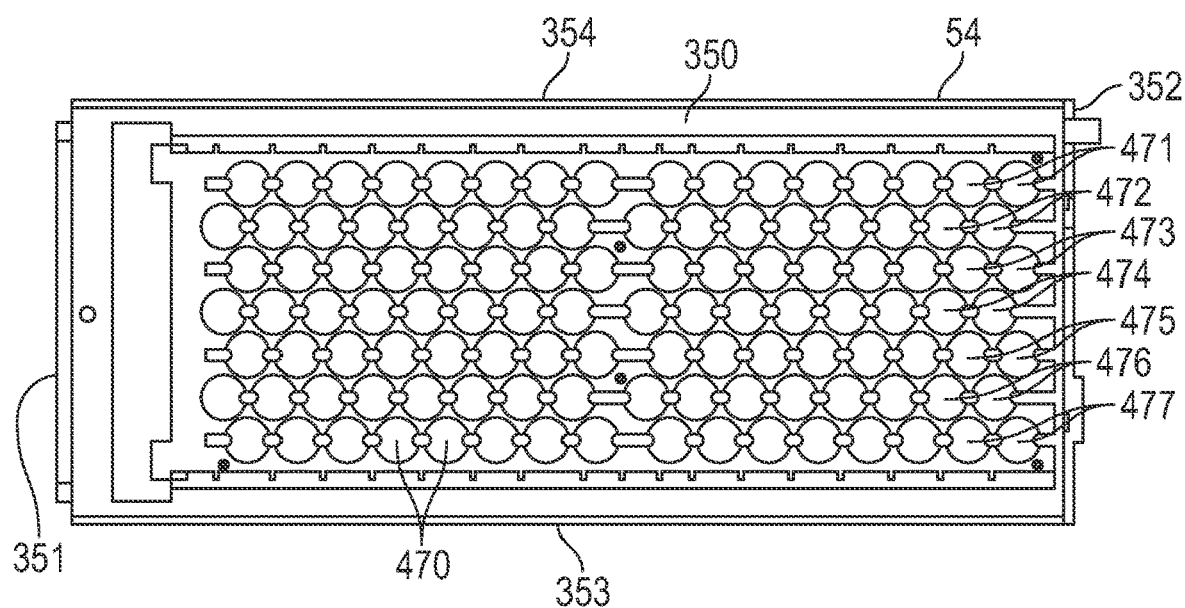
FIG. 12 is a top view of the first retention housing of FIG. 11.
Figure 13:
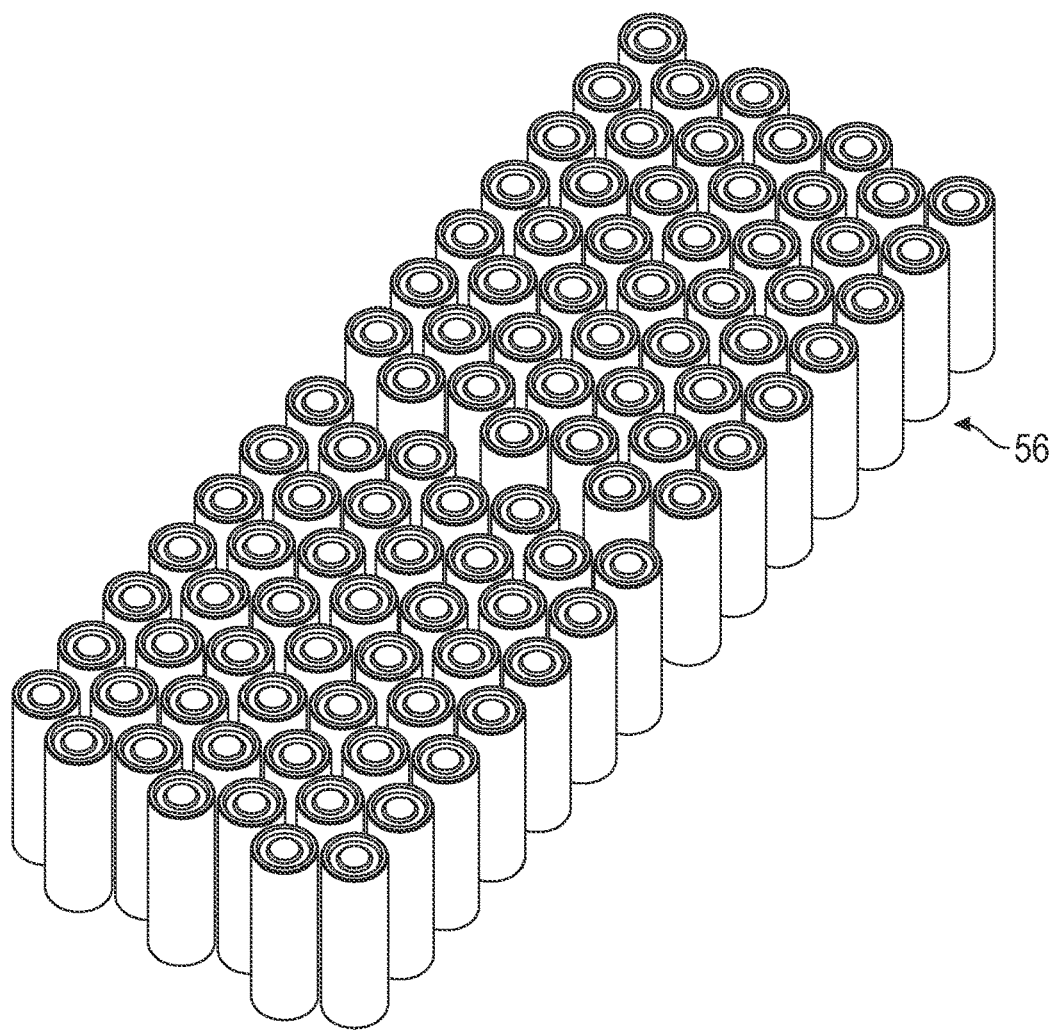
FIG. 13 is an isometric view of the plurality of cylindrical battery cells of FIG. 6.

Referring to FIGS. 4, 11, 12 and 17, the first retention housing 54 holds the plurality of cylindrical battery cells 56 therein and on and against the central cooling portion 280 (shown in FIG. 5) such that the battery cells 56 thermally communicate central cooling portion 280. Further, the first retention housing 54 holds the laminated busbar assembly 68 (shown in FIG. 6) thereon. The first retention housing 54 is disposed within the first region 291 (shown in FIG. 5) defined by the central cooling portion 280 and the first and second exterior plates 141, 142. Referring to FIG. 12, the first retention housing 54 has an end wall 350, a first side wall 351, a second side wall 352, a third side wall 353, and a fourth side wall 354. The first and second side walls 351, 352 extend substantially parallel to one another. Further, the third and fourth side walls 353, 354 extend substantially parallel to one another and perpendicular to the first and second side walls 351, 352. In an exemplary embodiment, the end wall 350 and the first, second, third, and fourth side walls 351, 352, 353, 354 are constructed of plastic.

Figure 7:
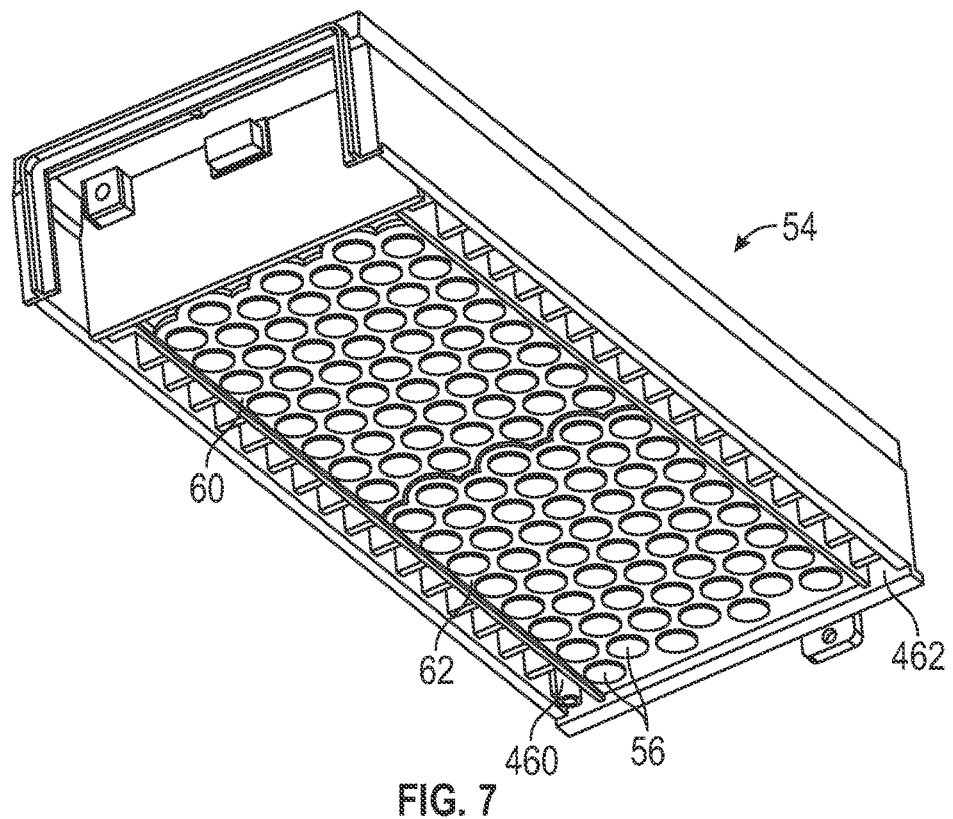
FIG. 7 is another isometric view of the first retention housing, the plurality of cylindrical battery cells, the first and second retaining plates of FIG. 6.
Figure 8:
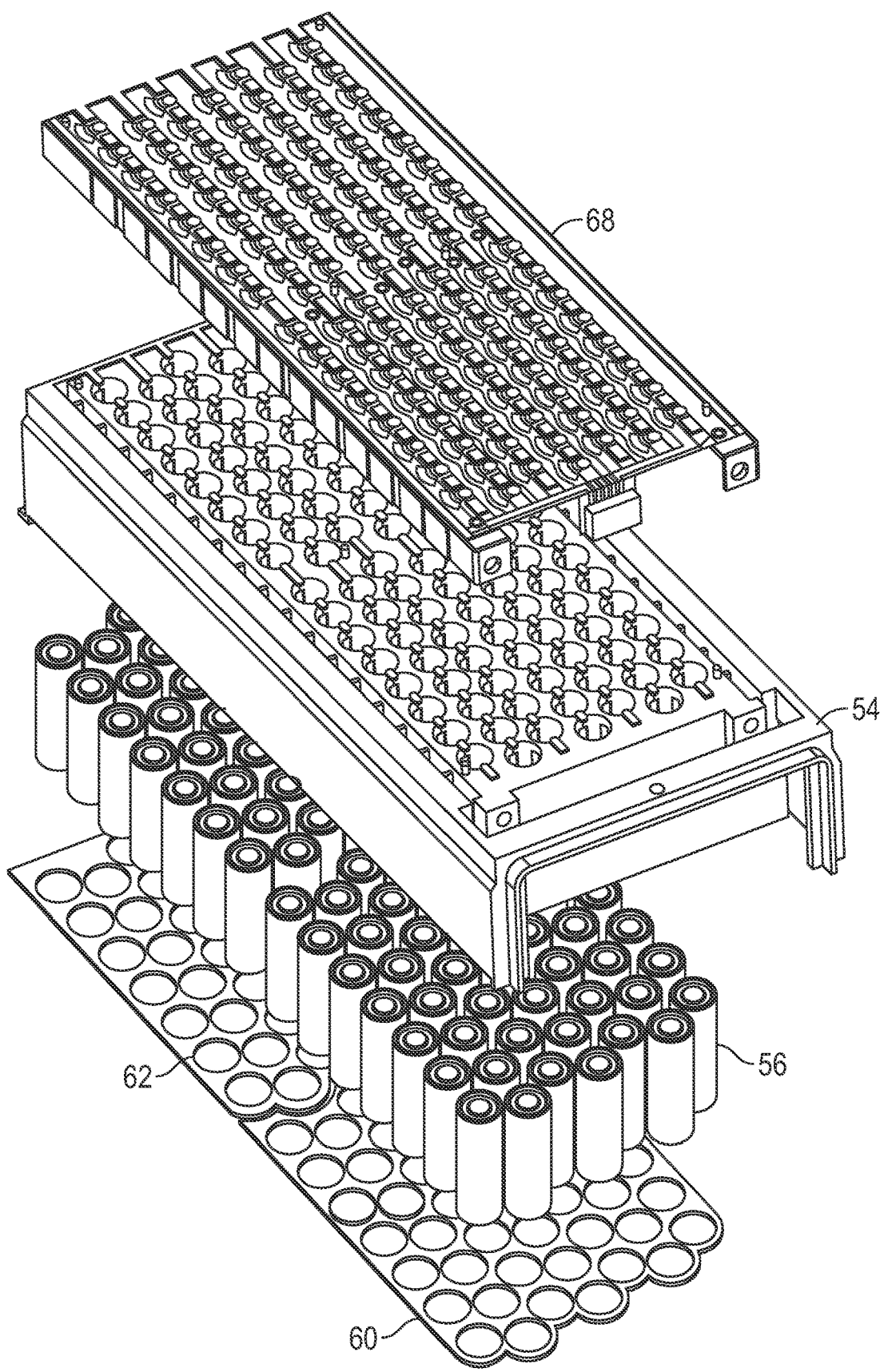
FIG. 8 is a partial exploded view of the first retention housing of FIG. 6, the plurality of cylindrical battery cells, the first and second retaining plates, and the laminated busbar assembly.
Figure 9:
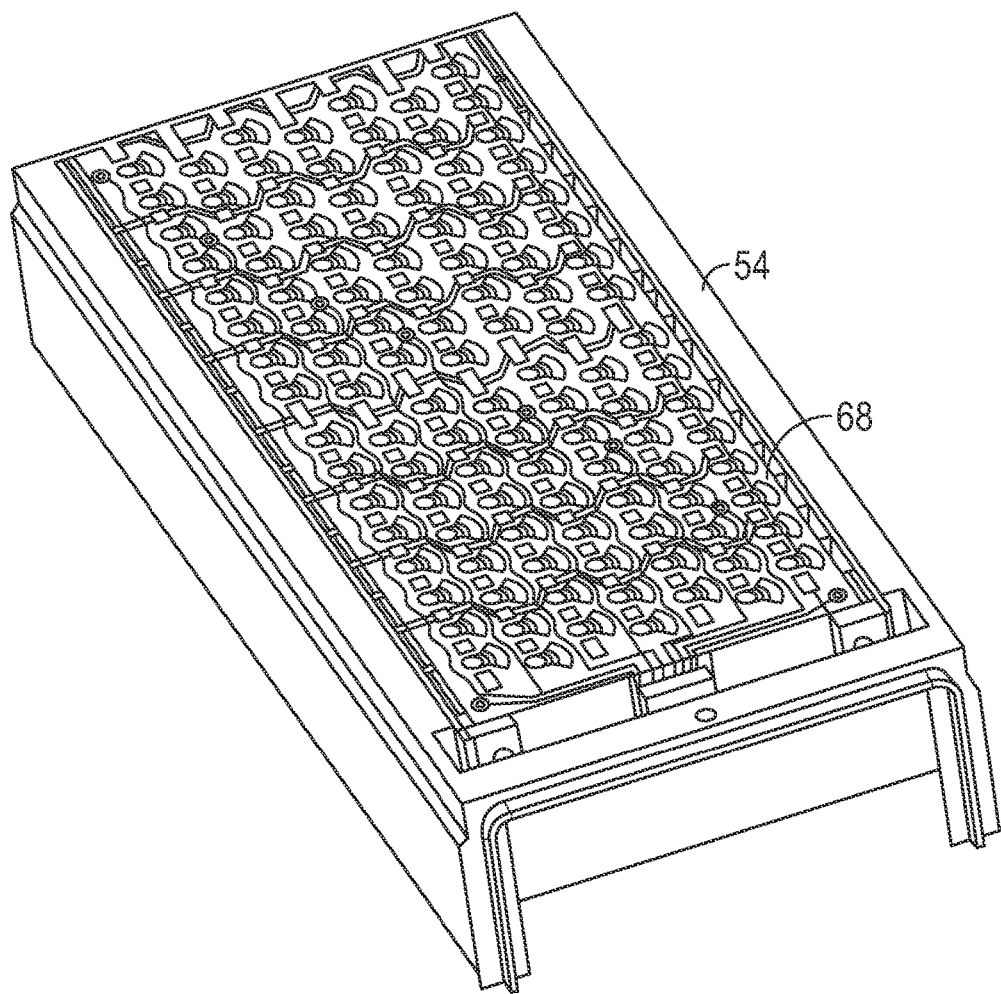
FIG. 9 is another isometric view of the first retention housing and the laminated busbar assembly of FIG. 6.
Figure 10:
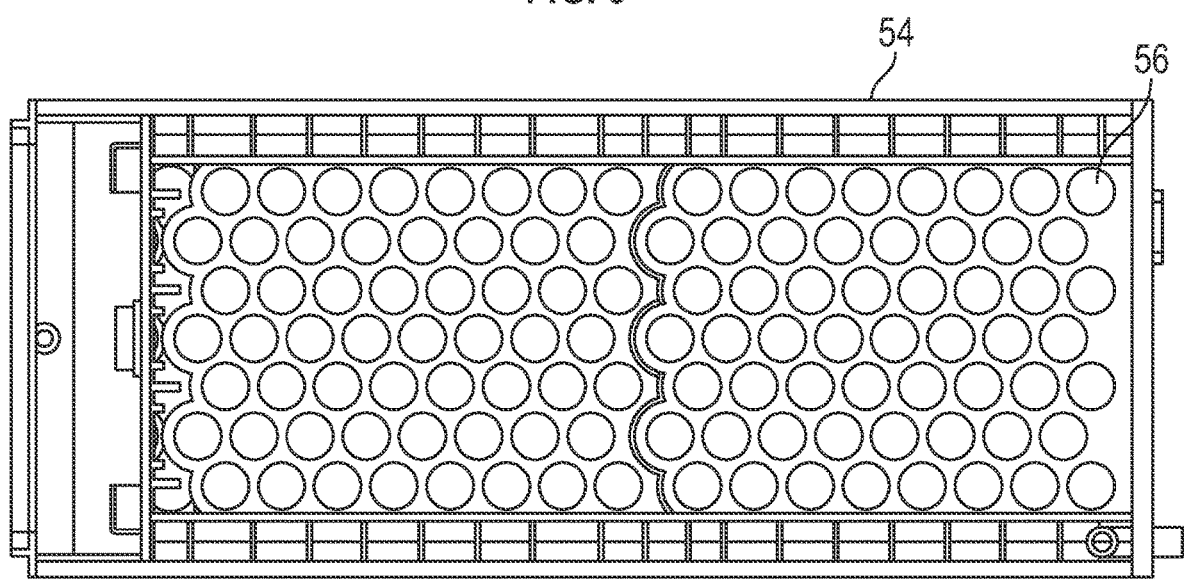
FIG. 10 is a bottom view of the first retention housing, the plurality of cylindrical battery cells, the first and second retaining plates of FIG. 6.
Figure 11:
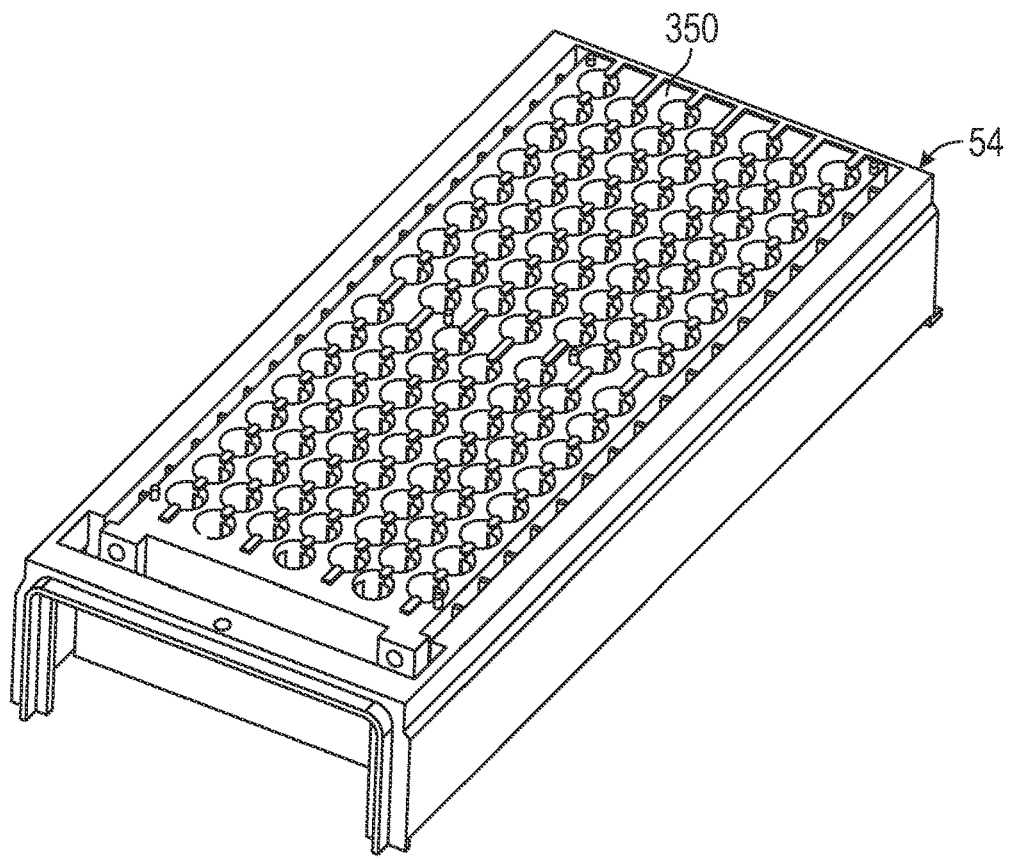
FIG. 11 is an isometric view of the first retention housing of FIG. 6.

Referring to FIGS. 7 and 12, the end wall 350 is coupled to the first, second, third, and fourth side walls 351, 352, 353, 354 to define an interior region 460 (shown in FIG. 7) and an open end 462. Referring to FIG. 12, the end wall 350 includes a plurality of apertures 470 extending therethrough. Each aperture of the plurality of apertures 470 is associated with a cylindrical battery cell of the plurality of cylindrical battery cells 56. The plurality of apertures 470 includes a first row of apertures 471, a second row of apertures 472, a third row of apertures 473, a fourth row of apertures 474, a fifth row of apertures 475, a sixth row of apertures 476, and a seventh row of apertures 477. Further, each row of apertures in the end wall 350 is aligned with a respective row of cylindrical battery cells in the plurality of cylindrical battery cells 56 such that each aperture in the end wall 350 is aligned and receives a top portion of a cylindrical battery cell therethrough.

The first side wall 351 is coupled to the end wall 350 and the third and fourth side walls 353, 354 and extends in a first direction perpendicular to the end wall 350. Further, the second side wall 352 is coupled to the end wall 350 and the third and fourth side walls 353, 354 and extends in a first direction perpendicular to the end wall 350. Also, the third side wall 353 is coupled to the end wall 350 and the first and second side walls 351, 352 and extends in a first direction perpendicular to the end wall 350. Further, the fourth side wall 354 is coupled to the end wall 350 and the first and second side walls 351, 352 and extends in a first direction perpendicular to the end wall 350.

First Plurality of Cylindrical Battery Cells

Referring to FIGS. 4, 7, 13 and 14, the plurality of cylindrical battery cells 56 are held within the first retention housing 54 and against the battery cell retention frame 50. Referring to FIG. 4, the plurality of cylindrical battery cells 56 includes a first row of battery cells 501, a second row of battery cells 502, a third row of battery cells 503, a fourth row of battery cells 504, a fifth row of battery cells 505, a sixth row of battery cells 506, and a seventh row of battery cells 507.

For purposes of simplicity, only the cylindrical battery cells in the first row of battery cells 501 will be explained in greater detail below. In particular, the first row of cylindrical battery cells 501 includes cylindrical battery cells 530, 532, 550, 552, 570, 572, 590, 592, 610, 612, 630, 632, 650, 652, 670, 672.

Figure 15:
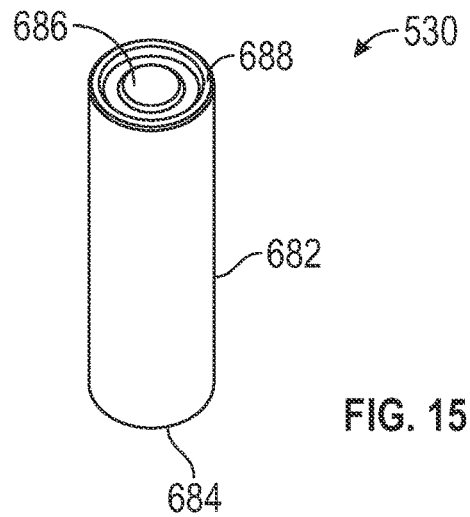
FIG. 15 is an isometric view of one of the battery cells in the plurality of cylindrical battery cells of FIG. 13.

Referring to FIG. 15, since each of the cylindrical battery cells in the plurality of cylindrical battery cells 56 have an identical structure, only the structure of the cylindrical battery cell 530 will be described in greater detail for purposes of simplicity. The cylindrical battery cell 530 includes an outer side surface 682, a bottom surface 684, a positive electrode 686, and a negative electrode 688. The positive electrode 686 is surrounded by the negative electrode 688. Further, the bottom surface 684 contacts the central cooling portion 280 (shown in FIG. 5) of the battery cell retention frame 50 such that heat energy from the cylindrical battery cell 530 is transferred to the central cooling portion 280.

First and Second Retaining Plates

Figure 16:
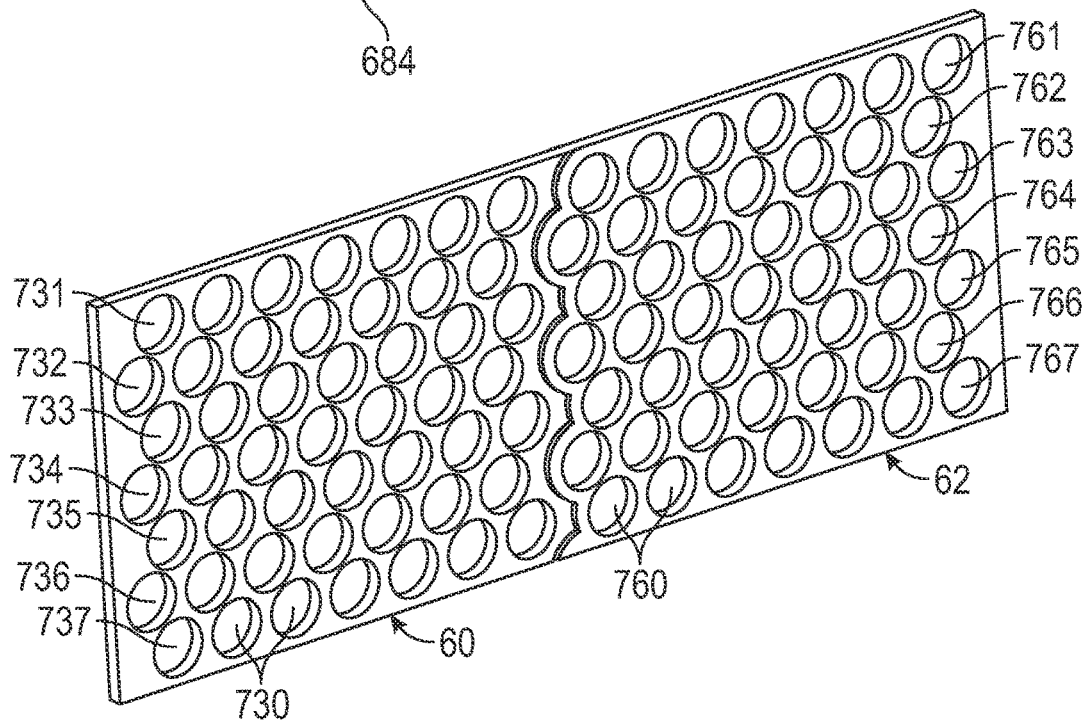
FIG. 16 is an isometric view of the first and second retaining plates of FIG. 7.
Figure 17:
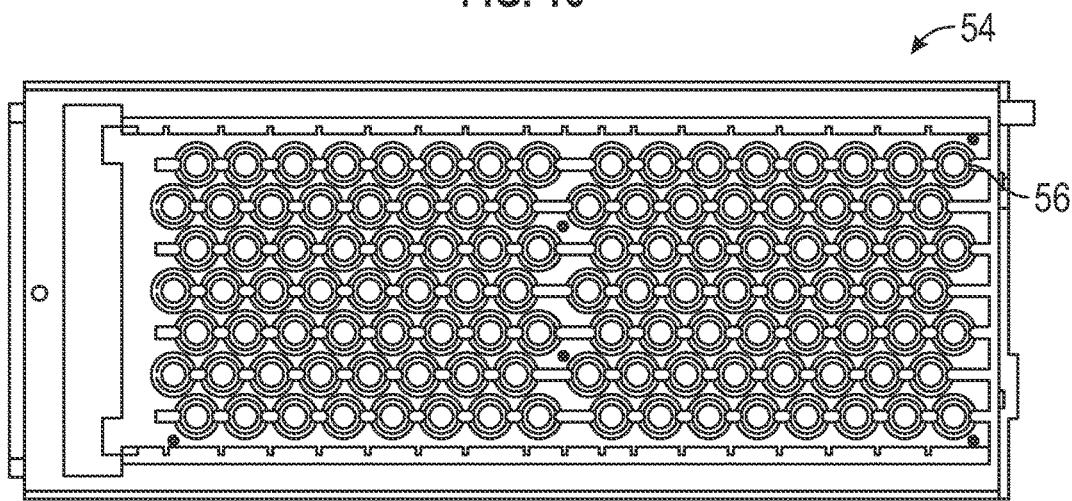
FIG. 17 is a top view of the first retention housing of FIG. 6 with the plurality of cylindrical battery cells therein.
Figure 18:
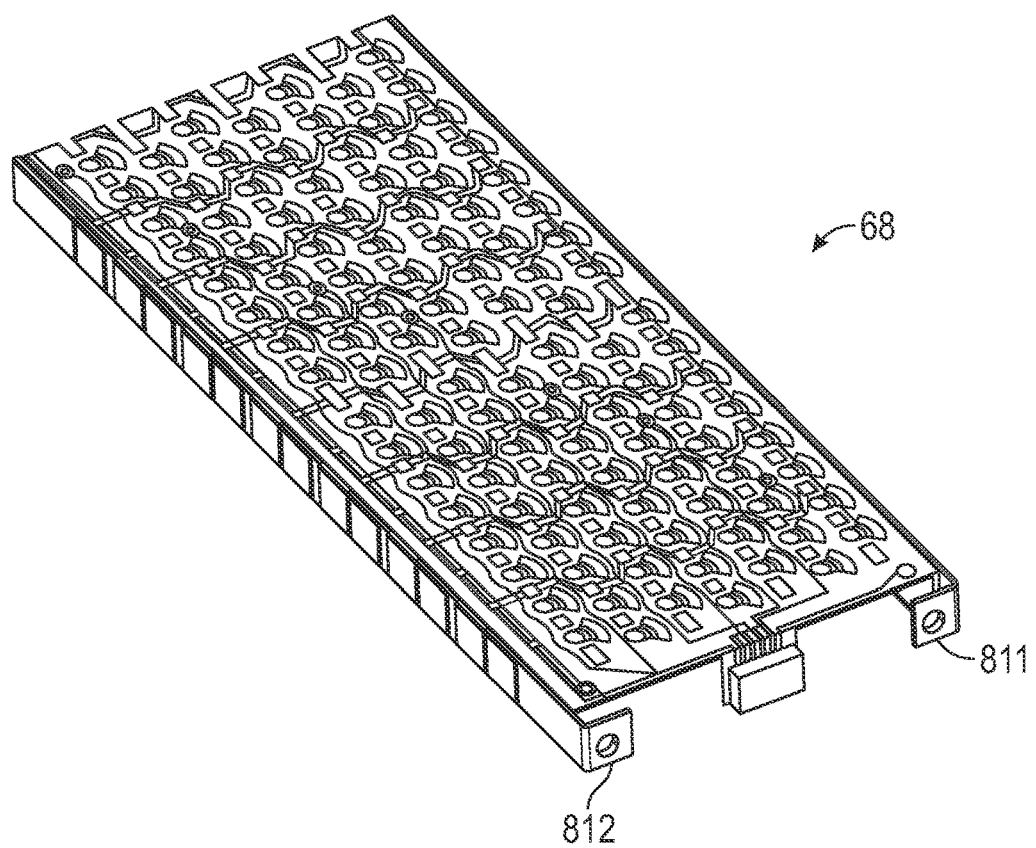
FIG. 18 is an isometric view of the laminated busbar assembly of FIG. 6.
Figure 19:
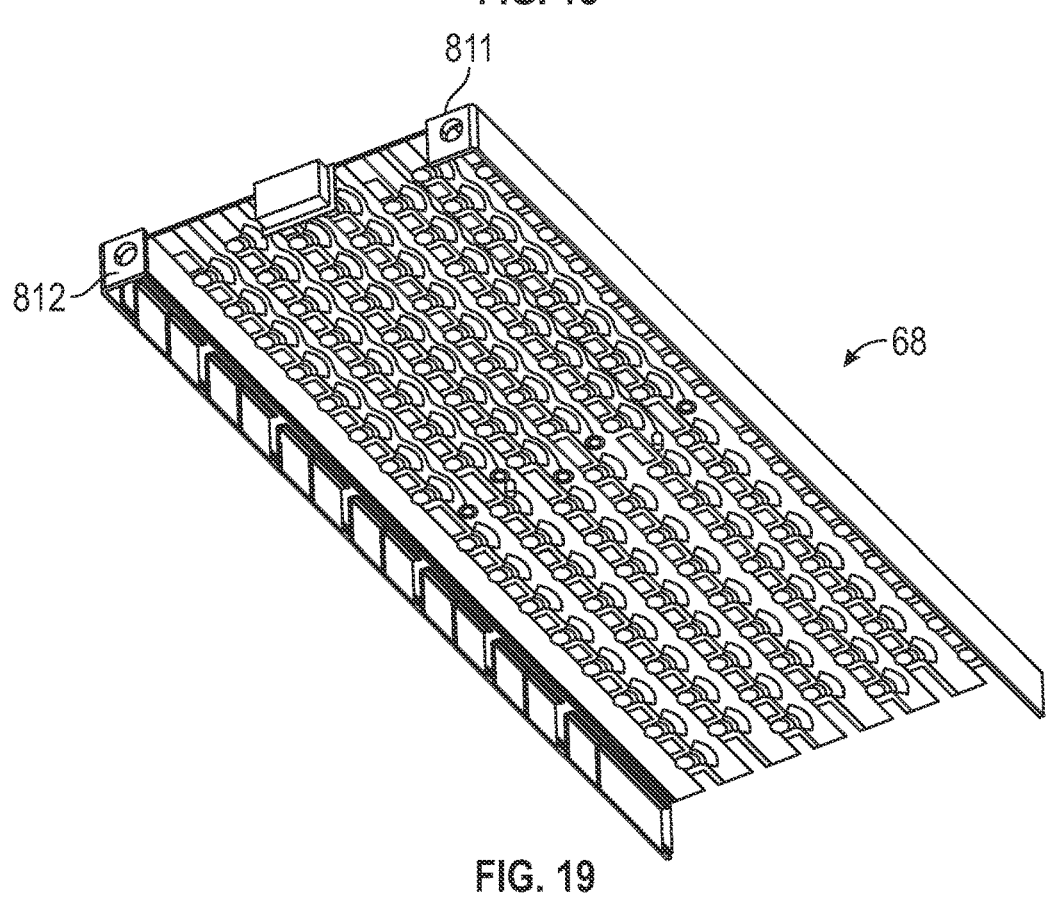
FIG. 19 is another isometric view of the laminated busbar assembly of FIG. 18.
Figure 20:
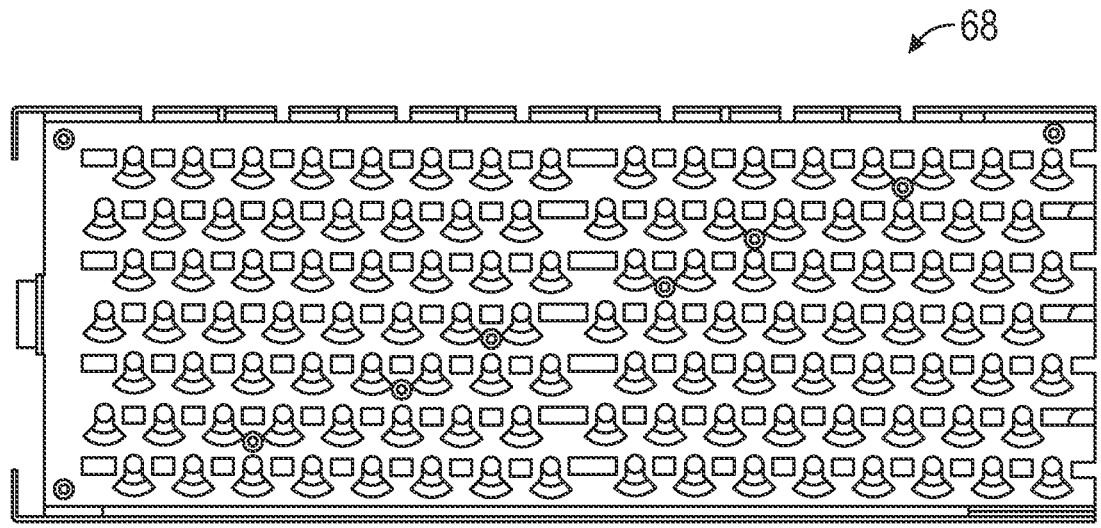
FIG. 20 is a top view of the laminated busbar assembly of FIG. 18.
Figure 21:
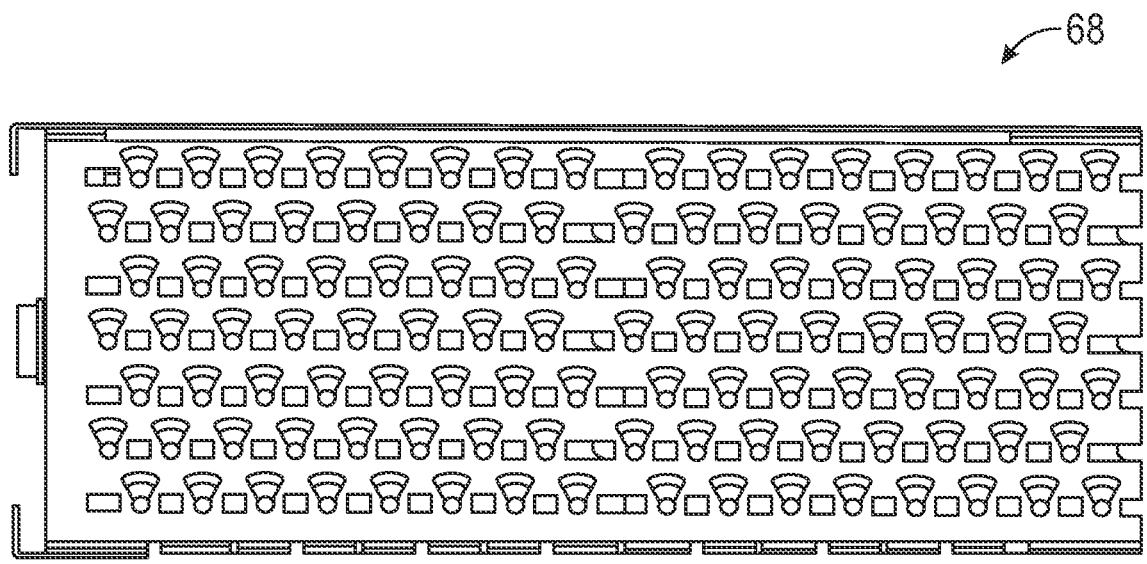
FIG. 21 is a bottom view of the laminated busbar assembly of FIG. 18.

Referring to FIGS. 7, 12 and 16, the first and second retaining plates 60, 62 are coupled to the first, second, third, fourth side walls 351, 352, 353, 354 (shown in FIG. 12) of the first retention housing 54 to hold the first plurality of cylindrical battery cells 56 within the interior region 460 (shown in FIG. 7) of the first retention housing 54. In an exemplary embodiment, the first and second retaining plates 60, 62 are constructed of plastic.

Referring to FIG. 16, the retaining plate 60 includes a plurality of apertures 730 extending therethrough. The plurality of apertures 730 includes a first row of apertures 731, a second row of apertures 732, a third row of apertures 733, a fourth row of apertures 734, a fifth row of apertures 735, a sixth row of apertures 736, and a seventh row of apertures 737. Each aperture of the first plurality of apertures 730 is sized to allow a bottom surface of a respective cylindrical battery cell to contact the central cooling portion 280 (shown in FIG. 4) while holding the cylindrical battery cell within the interior region 460 (shown in FIG. 7) of the first retention housing 54.

The retaining plate 62 includes a plurality of apertures 760 extending therethrough. The plurality of apertures 760 includes a first row of apertures 761, a second row of apertures 762, a third row of apertures 763, a fourth row of apertures 764, a fifth row of apertures 765, a sixth row of apertures 766, and a seventh row of apertures 767—which align with the first row of apertures 731, the second row of apertures 732, the third row of apertures 733, the fourth row of apertures 734, the fifth row of apertures 735, the sixth row of apertures 736, and the seventh row of apertures 737, respectively. Each aperture of the plurality of apertures 760 is sized to allow a bottom surface of a respective cylindrical battery cell to contact the central cooling portion 280 (shown in FIG. 4) while holding the cylindrical battery cell within the interior region 460 of the first retention housing 54.

Figure 14:
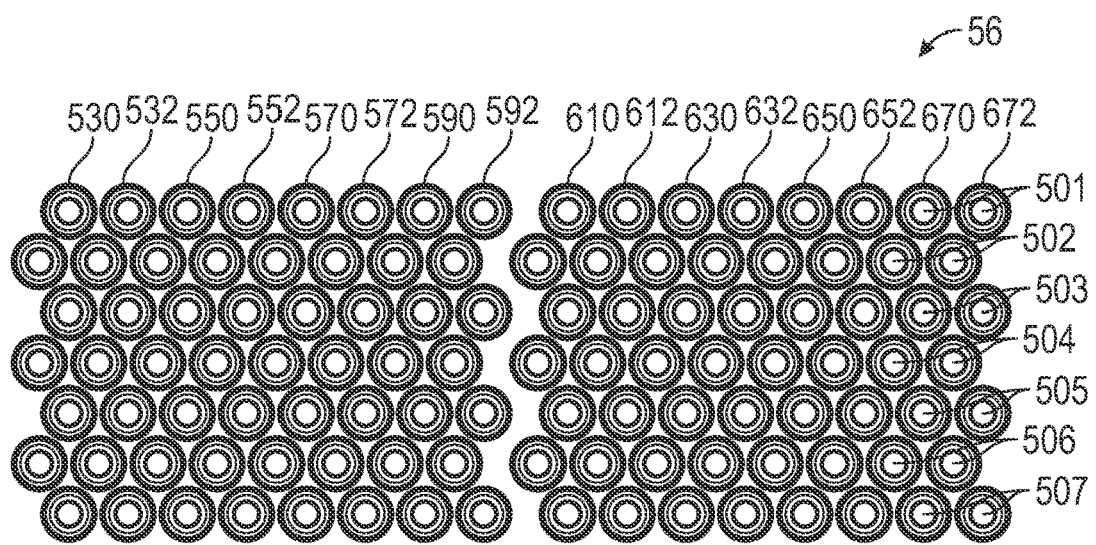
FIG. 14 is a top view of the plurality of cylindrical battery cells of FIG. 13.

Referring to FIGS. 14 and 16, the first row of apertures 731 of the retaining plate 60, and the first row of apertures 761 of the retaining plate 62 align with the first row of battery cells 501. Further, the second row of apertures 732 of the retaining plate 60, and the second row of apertures 762 of the retaining plate 62 align with the second row of battery cells 502. Further, the third row of apertures 733 of the retaining plate 60, and the third row of apertures 763 of the retaining plate 62 align with the third row of battery cells 503. Further, the fourth row of apertures 734 of the retaining plate 60, and the fourth row of apertures 764 of the retaining plate 62 align with the fourth row of battery cells 504. Further, the fifth row of apertures 735 of the retaining plate 60, and the fifth row of apertures 765 of the retaining plate 62 align with the fifth row of battery cells 505. Further, the sixth row of apertures 736 of the retaining plate 60, and the sixth row of apertures 766 of the retaining plate 62 align with the sixth row of battery cells 506. Further, the seventh row of apertures 737 of the retaining plate 60, and the seventh row of apertures 767 of the retaining plate 62 align with the seventh row of battery cells 507.

Laminated Busbar Assembly

Figure 22:
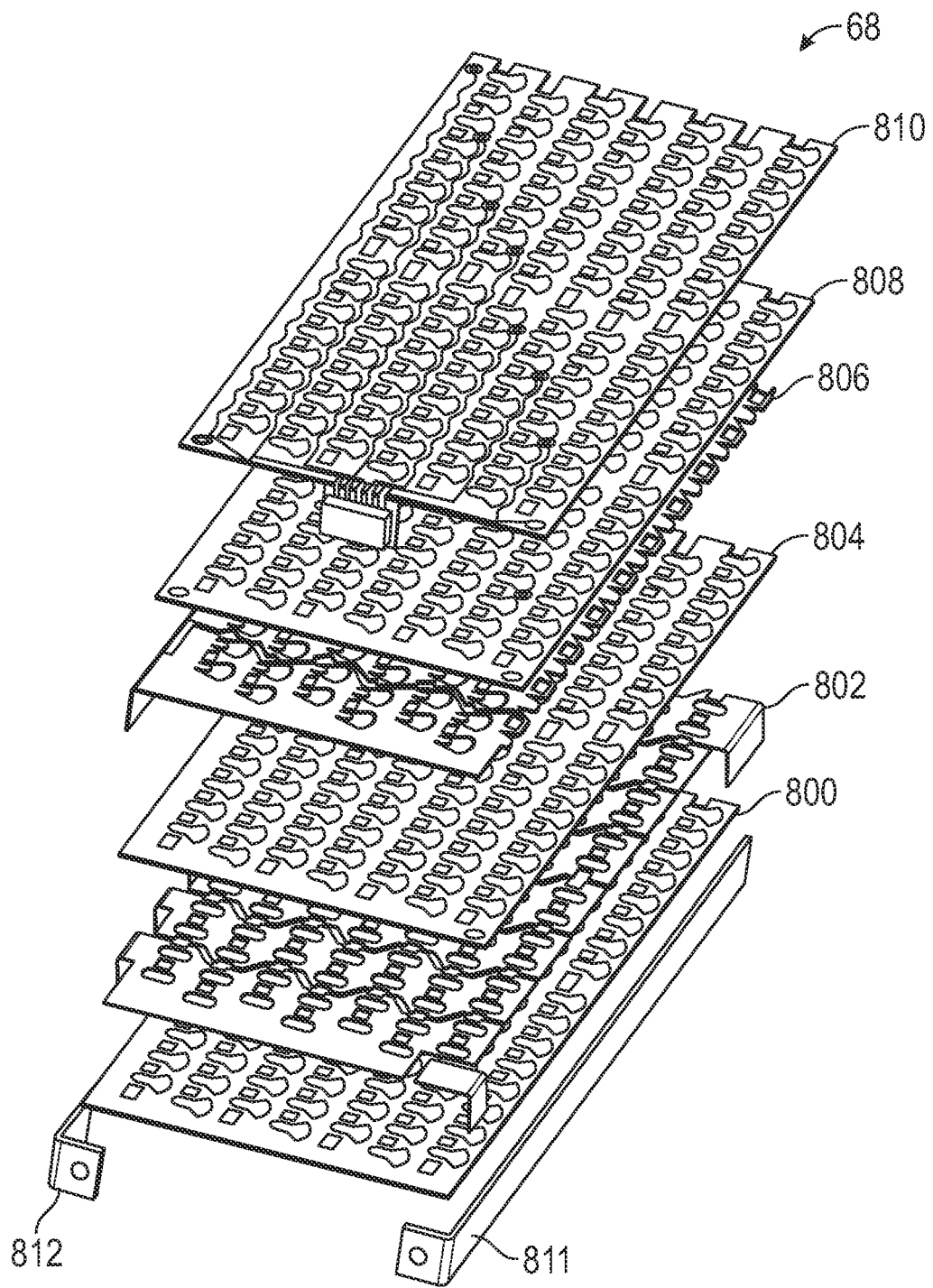
FIG. 22 is an exploded view of the laminated busbar assembly of FIG. 18.

Referring to FIGS. 6, 14 and 18-36, the laminated busbar assembly 68 is provided to electrically couple the first plurality of cylindrical battery cells 56 in a desired electrical configuration. Referring to FIG. 22, the laminated busbar assembly 68 includes a bottom isolation layer 800, a first busbar layer 802, an intermediate isolation layer 804, a second busbar layer 806, a top isolation layer 808, a sensor layer 810, a busbar 811, and a busbar 812. In an exemplary embodiment, the bottom isolation layer 800, the first busbar layer 802, the intermediate isolation layer 804, the second busbar layer 806, the top isolation layer 808, and the sensor layer 810 are coupled together utilizing an adhesive disposed on edges thereof.

The first busbar layer 802 is coupled to and between the bottom isolation layer 800 and the intermediate isolation layer 804. In particular, the first busbar layer 802 contacts the bottom isolation layer 800 and the intermediate isolation layer 804. The second busbar layer 806 is coupled to and between the intermediate isolation layer 804 and the top isolation layer 808. In particular, the second busbar layer contacts the intermediate isolation layer 804 and the top isolation layer 808. Further, the top isolation layer 808 is coupled to and between the second busbar layer 806 and the sensor layer 810. In particular, the top isolation layer 808 contacts the second busbar layer 806 and the sensor layer 810.

Bottom Isolation Layer

Figure 23:
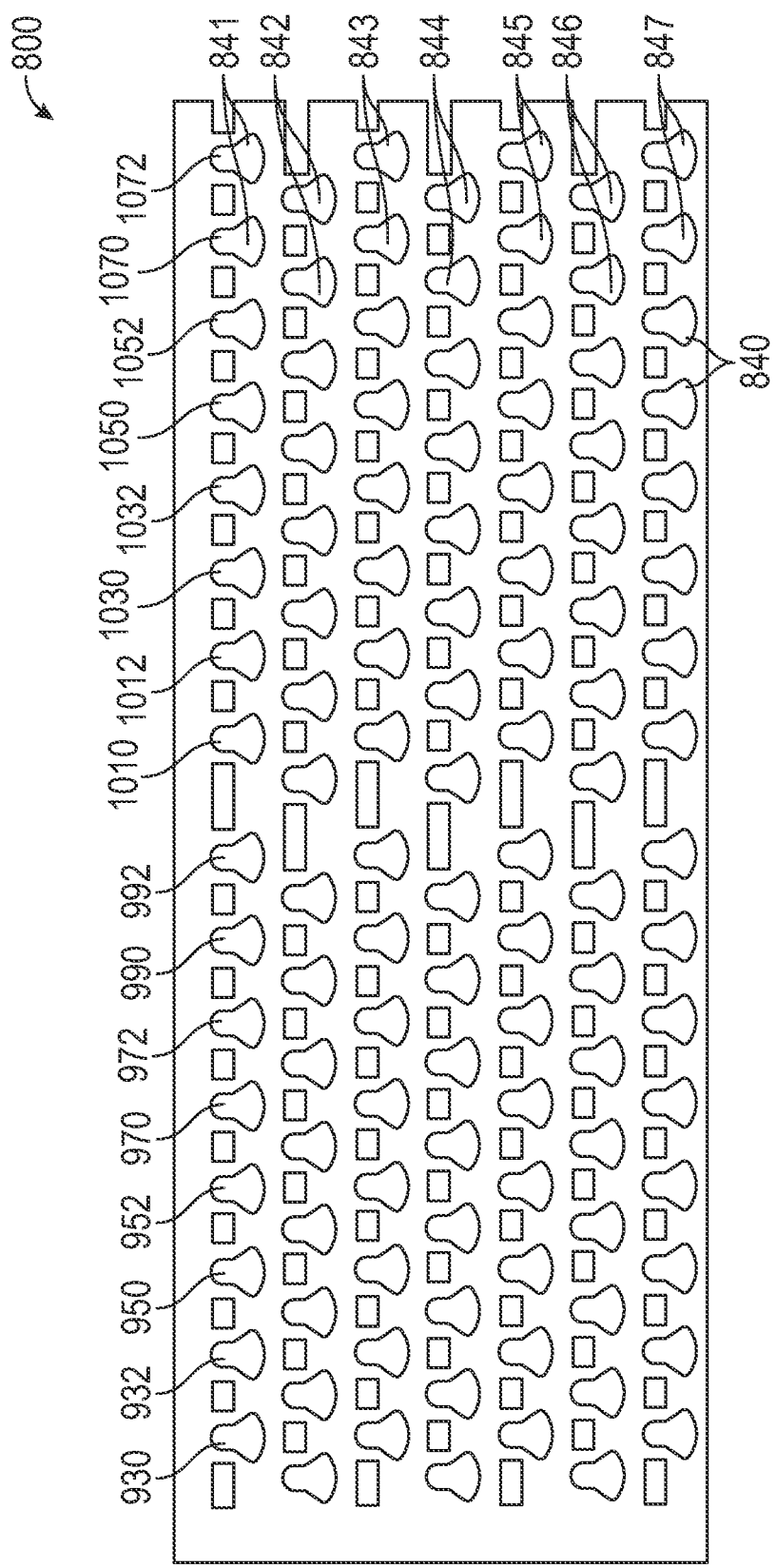
FIG. 23 is a top view of a bottom isolation layer utilized in the laminated busbar assembly of FIG. 18.
Figure 24:
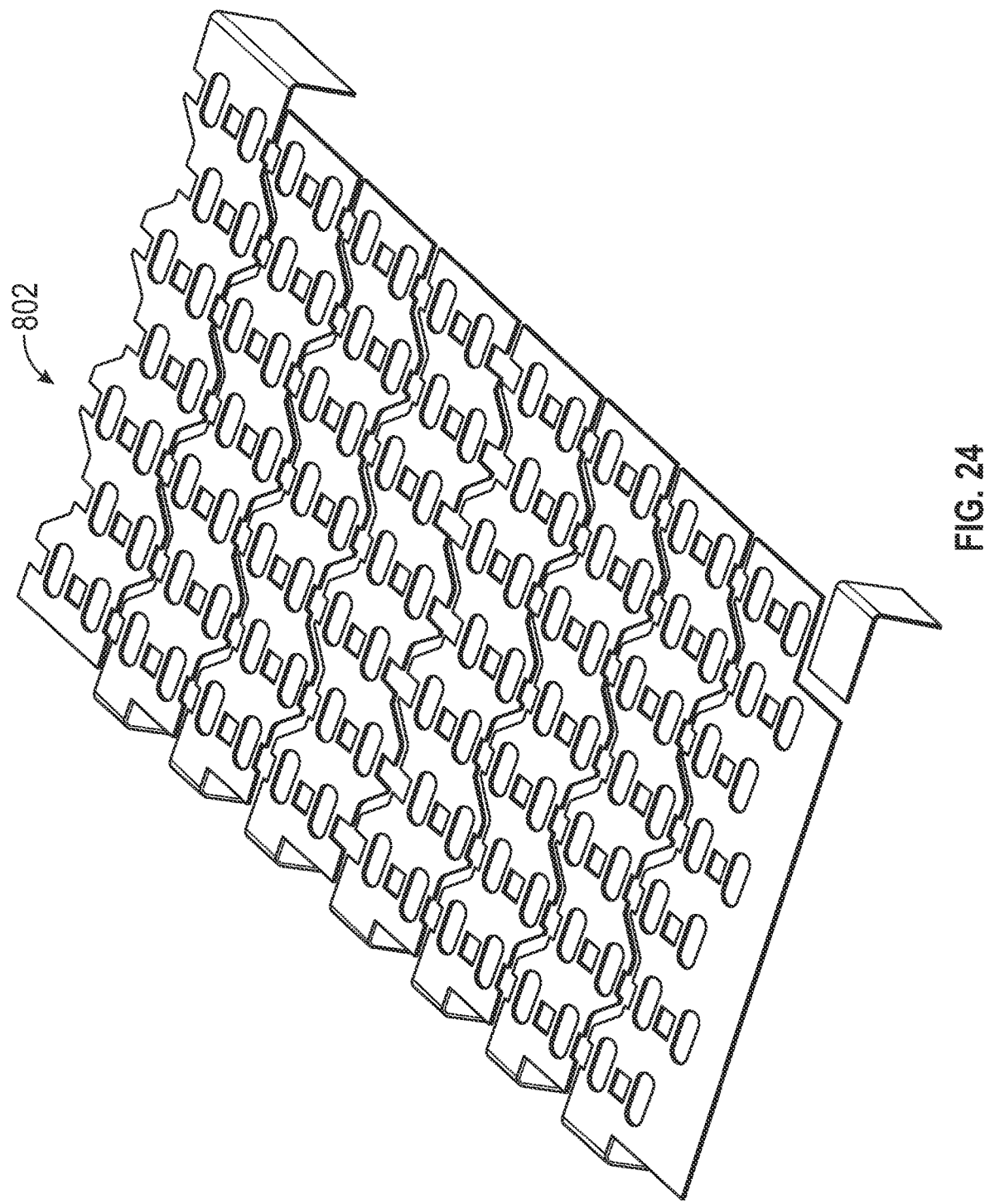
FIG. 24 is an isometric view of a first busbar layer utilized in the laminated busbar assembly of FIG. 18 which is coupled to negative electrodes of a plurality of cylindrical battery cells.
Figure 25:
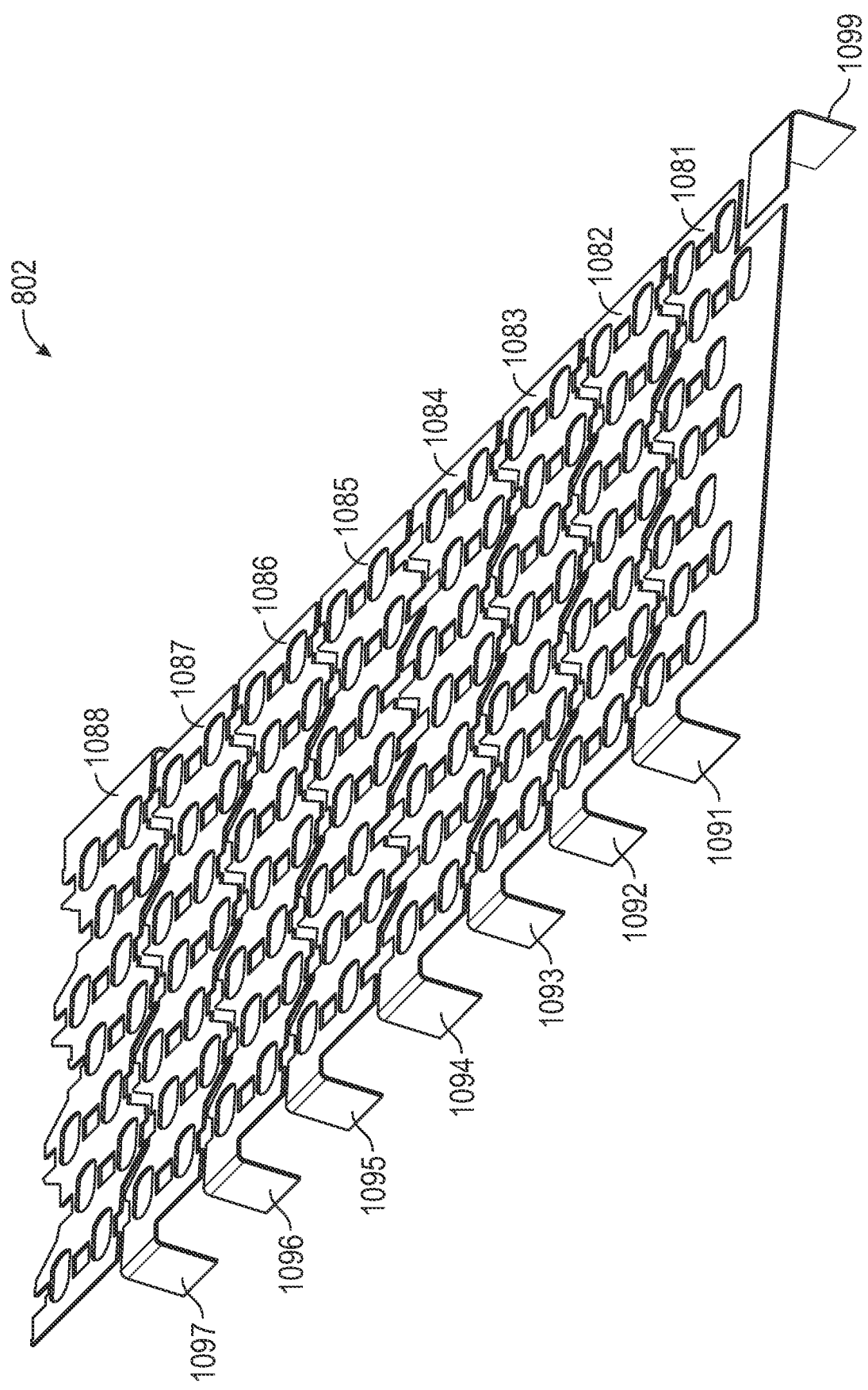
FIG. 25 is another isometric view of the first busbar layer of FIG. 24.

Referring to FIGS. 14, 22 and 23, the bottom isolation layer 800 is disposed against and contacts the first plurality of cylindrical battery cells 56. In an exemplary embodiment, the bottom isolation layer 800 is constructed of an electrically insulative material. Referring to FIG. 23, the bottom isolation layer 800 includes a plurality of apertures 840 extending therethrough. In particular, the plurality of apertures 840 include a first row of apertures 841, a second row of apertures 842, a third row of apertures 843, a fourth row of apertures 844, a fifth row of apertures 845, a sixth row of apertures 846, and a seventh row of apertures 847.

For purposes of simplicity, only the first row of apertures 841 will be discussed hereinafter. In particular, the first row of apertures 841 includes apertures 930, 932, 950, 952, 970, 972, 990, 992, 1010, 1012, 1030, 1032, 1050, 1052, 1070, 1072.

Referring to FIG. 33, since the shape of each of the apertures in the plurality of apertures 840 are identical, only the shape of the aperture 930 will be discussed in greater detail below. In particular, the aperture 930 has a circular aperture portion 1060 and a skirt-shaped aperture portion 1062 communicating with the circular aperture portion 1060. As will be discussed in greater detail below, the circular aperture portion 1060 communicates with a positive electrode of the cylindrical battery cell 530, and the skirt-shaped portion communicates with a portion of a negative electrode of the cylindrical battery cell 530 that is exposed through the skirt-shaped aperture portion 1062.

Referring to FIGS. 14, 15, and 23, for purposes of simplicity, a brief explanation of how the cylindrical battery cells in the first row of battery cells 501 contact and communicate with the bottom isolation layer 800 will be explained.

The aperture 930 is sized and shaped to receive a positive electrode of the cylindrical battery cell 530 therethrough, and to expose a portion of the negative electrode of the cylindrical battery cell 530.

The aperture 932 is sized and shaped to receive a positive electrode of the cylindrical battery cell 532 therethrough, and to expose a portion of the negative electrode of the cylindrical battery cell 532.

The aperture 950 is sized and shaped to receive a positive electrode of the cylindrical battery cell 550 therethrough, and to expose a portion of the negative electrode of the cylindrical battery cell 550.

The aperture 952 is sized and shaped to receive a positive electrode of the cylindrical battery cell 552 therethrough, and to expose a portion of the negative electrode of the cylindrical battery cell 552.

The aperture 970 is sized and shaped to receive a positive electrode of the cylindrical battery cell 570 therethrough, and to expose a portion of the negative electrode of the cylindrical battery cell 570.

The aperture 972 is sized and shaped to receive a positive electrode of the cylindrical battery cell 572 therethrough, and to expose a portion of the negative electrode of the cylindrical battery cell 572.

The aperture 990 is sized and shaped to receive a positive electrode of the cylindrical battery cell 590 therethrough, and to expose a portion of the negative electrode of the cylindrical battery cell 590.

The aperture 992 is sized and shaped to receive a positive electrode of the cylindrical battery cell 592 therethrough, and to expose a portion of the negative electrode of the cylindrical battery cell 592.

The aperture 1010 is sized and shaped to receive a positive electrode of the cylindrical battery cell 610 therethrough, and to expose a portion of the negative electrode of the cylindrical battery cell 610.

The aperture 1012 is sized and shaped to receive a positive electrode of the cylindrical battery cell 612 therethrough, and to expose a portion of the negative electrode of the cylindrical battery cell 612.

The aperture 1030 is sized and shaped to receive a positive electrode of the cylindrical battery cell 630 therethrough, and to expose a portion of the negative electrode of the cylindrical battery cell 630.

The aperture 1032 is sized and shaped to receive a positive electrode of the cylindrical battery cell 632 therethrough, and to expose a portion of the negative electrode of the cylindrical battery cell 632.

The aperture 1050 is sized and shaped to receive a positive electrode of the cylindrical battery cell 650 therethrough, and to expose a portion of the negative electrode of the cylindrical battery cell 650.

The aperture 1052 is sized and shaped to receive a positive electrode of the cylindrical battery cell 652 therethrough, and to expose a portion of the negative electrode of the cylindrical battery cell 652.

The aperture 1070 is sized and shaped to receive a positive electrode of the cylindrical battery cell 670 therethrough, and to expose a portion of the negative electrode of the cylindrical battery cell 670.

The aperture 1072 is sized and shaped to receive a positive electrode of the cylindrical battery cell 672 therethrough, and to expose a portion of the negative electrode of the cylindrical battery cell 672.

First Busbar Layer

Figure 26:
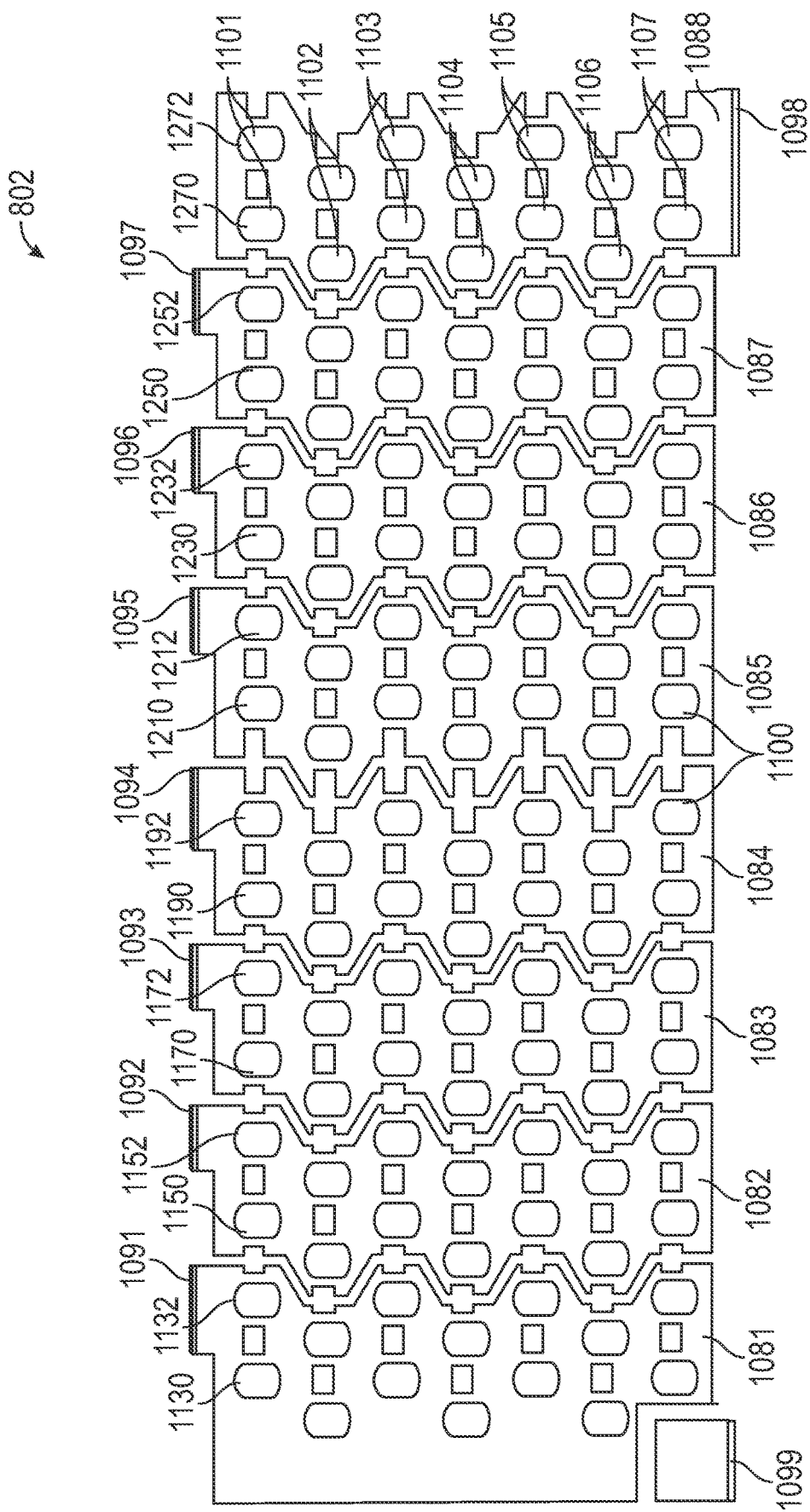
FIG. 26 is a top view of the first busbar layer of FIG. 24.

Referring to FIGS. 22 and 24-26, the first busbar layer 802 is disposed against and contacts the bottom isolation layer 800. Referring to FIG. 26, the first busbar layer 802 includes a first layer portion 1081, a second layer portion 1082, a third layer portion 1083, a fourth layer portion 1084, a fifth layer portion 1085, a sixth layer portion 1086, a seventh layer portion 1087, and an eighth layer portion 1088. The first busbar layer 802 further includes a first outer side wall 1091, a second outer side wall 1092, a third outer side wall 1093, a fourth outer side wall 1094, a fifth outer side wall 1095, a sixth outer side wall 1096, a seventh outer side wall 1097, an eighth outer side wall 1098, and a bracket portion 1099.

Referring to FIG. 26, the first, second, third, fourth, fifth, sixth, seventh, eighth layer portions 1081, 1082, 1083, 1084, 1085, 1086, 1087, 1088 are spaced apart from one another and extend substantially parallel to one another. Further, each of the first, second, third, fourth, fifth, sixth, seventh, eighth layer portions 1081, 1082, 1083, 1084, 1085, 1086, 1087, 1088 are constructed of an electrically conductive metal.

The first busbar layer 802 further includes a plurality of apertures 1100 extending therethrough. The plurality of apertures 1100 includes a first row of apertures 1101, a second row of apertures 1102, a third row of apertures 1103, a fourth row of apertures 1104, a fifth row of apertures 1105, a sixth row apertures 1106, and a seventh row of apertures 1107—which align with the first row of apertures 841, the second row of apertures 842, the third row of apertures 843, the fourth row of apertures 844, the fifth row of apertures 845, the sixth row of apertures 846, and the seventh row of apertures 847 of the bottom isolation layer 800 (shown in FIG. 23). Each of the apertures in each row of apertures in the first busbar layer 802 are spaced apart from one another. For purposes of simplicity, only the first row of apertures 1101 will be discussed in greater detail herein. The first row of apertures 1101 includes apertures 1130, 1132, 1150, 1152, 1170, 1172, 1190, 1192, 1210, 1212, 1230, 1232, 1250, 1252, 1270, 1272.

First Layer Portion

Referring to FIGS. 14 and 26, the first layer portion 1081 includes the apertures 1130, 1132 extending therethrough. A positive electrode of the cylindrical battery cell 530 extends through the aperture 1130. Further, a portion of the negative electrode of the cylindrical battery cell 530 is exposed through the bottom isolation layer 800 and contacts the first layer portion 1081 (in a region 1290 in FIG. 34) proximate to the aperture 1130. In an exemplary embodiment, the region 1290 of the first layer portion 1081 can be depressed towards the negative electrode of the cylindrical battery cell 530 utilizing a welding tool (not shown) to weld/couple the region 1290 to the negative electrode of the cylindrical battery cell 530. A positive electrode of the cylindrical battery cell 532 extends through the aperture 1132. Further, a portion of the negative electrode of the cylindrical battery cell 532 is exposed through the bottom isolation layer 800 and contacts the first layer portion 1081 proximate to the aperture 1132. The first outer side wall 1091 is coupled to an outer edge of the first layer 1081 and extends substantially perpendicular to the first layer portion 1081.

Second Layer Portion

The second layer portion 1082 includes the apertures 1150, 1152 extending therethrough. A positive electrode of the cylindrical battery cell 550 extends through the aperture 1150. Further, a portion of the negative electrode of the cylindrical battery cell 550 is exposed through the bottom isolation layer 800 and contacts the second layer portion 1082 proximate to the aperture 1150. A positive electrode of the cylindrical battery cell 552 extends through the aperture 1152. Further, a portion of the negative electrode of the cylindrical battery cell 552 is exposed through the bottom isolation layer 800 and contacts the second layer portion 1082 proximate to the aperture 1152. The second outer side wall 1092 is coupled to an outer edge of the second layer 1082 and extends substantially perpendicular to the second layer portion 1082.

Third Layer Portion

The third layer portion 1083 includes the apertures 1170, 1172 extending therethrough. A positive electrode of the cylindrical battery cell 570 extends through the aperture 1170. Further, a portion of the negative electrode of the cylindrical battery cell 570 is exposed through the bottom isolation layer 800 and contacts the third layer portion 1083 proximate to the aperture 1170. A positive electrode of the cylindrical battery cell 572 extends through the aperture 1172. Further, a portion of the negative electrode of the cylindrical battery cell 572 is exposed through the bottom isolation layer 800 and contacts the third layer portion 1083 proximate to the aperture 1172. The third outer side wall 1093 is coupled to an outer edge of the third layer portion 1083 and extends substantially perpendicular to the third layer portion 1083.

Fourth Layer Portion

The fourth layer portion 1084 includes the apertures 1190, 1192 extending therethrough. A positive electrode of the cylindrical battery cell 590 extends through the aperture 1190. Further, a portion of the negative electrode of the cylindrical battery cell 590 is exposed through the bottom isolation layer 800 and contacts the fourth layer portion 1084 proximate to the aperture 1190. A positive electrode of the cylindrical battery cell 572 extends through the aperture 1192. Further, a portion of the negative electrode of the cylindrical battery cell 592 is exposed through the bottom isolation layer 800 and contacts the fourth layer portion 1084 proximate to the aperture 1192. The fourth outer side wall 1094 is coupled to an outer edge of the fourth layer portion 1084 and extends substantially perpendicular to the fourth layer portion 1084.

Fifth Layer Portion

The fifth layer portion 1085 includes the apertures 1210, 1212 extending therethrough. A positive electrode of the cylindrical battery cell 610 extends through the aperture 1210. Further, a portion of the negative electrode of the cylindrical battery cell 610 is exposed through the bottom isolation layer 800 and contacts the fifth layer portion 1085 proximate to the aperture 1210. A positive electrode of the cylindrical battery cell 612 extends through the aperture 1212. Further, a portion of the negative electrode of the cylindrical battery cell 612 is exposed through the bottom isolation layer 800 and contacts the fifth layer portion 1085 proximate to the aperture 1212. The fifth outer side wall 1095 is coupled to an outer edge of the fifth layer portion 1085 and extends substantially perpendicular to the fifth layer portion 1085.

Sixth Layer Portion

The sixth layer portion 1086 includes the apertures 1230, 1232 extending therethrough. A positive electrode of the cylindrical battery cell 630 extends through the aperture 1230. Further, a portion of the negative electrode of the cylindrical battery cell 630 is exposed through the bottom isolation layer 800 and contacts the sixth layer portion 1086 proximate to the aperture 1230. A positive electrode of the cylindrical battery cell 632 extends through the aperture 1232. Further, a portion of the negative electrode of the cylindrical battery cell 632 is exposed through the bottom isolation layer 800 and contacts the sixth layer portion 1086 proximate to the aperture 1232. The sixth outer side wall 1096 is coupled to an outer edge of the sixth layer portion 1086 and extends substantially perpendicular to the sixth layer portion 1086.

Seventh Layer Portion

The seventh layer portion 1087 includes the apertures 1250, 1252 extending therethrough. A positive electrode of the cylindrical battery cell 650 extends through the aperture 1250. Further, a portion of the negative electrode of the cylindrical battery cell 650 is exposed through the bottom isolation layer 800 and contacts the seventh layer portion 1087 proximate to the aperture 1250. A positive electrode of the cylindrical battery cell 652 extends through the aperture 1252. Further, a portion of the negative electrode of the cylindrical battery cell 652 is exposed through the bottom isolation layer 800 and contacts the seventh layer portion 1087 proximate to the aperture 1252. The seventh outer side wall 1097 is coupled to an outer edge of the seventh layer portion 1087 and extends substantially perpendicular to the seventh layer portion 1087.

Eighth Layer Portion

The eighth layer portion 1088 includes the apertures 1270, 1272 extending therethrough. A positive electrode of the cylindrical battery cell 670 extends through the aperture 1270. Further, a portion of the negative electrode of the cylindrical battery cell 670 is exposed through the bottom isolation layer 800 and contacts the eighth layer portion 1088 proximate to the aperture 1270. A positive electrode of the cylindrical battery cell 672 extends through the aperture 1272. Further, a portion of the negative electrode of the cylindrical battery cell 672 is exposed through the bottom isolation layer 800 and contacts the eighth layer portion 1088 proximate to the aperture 1272. The eighth outer side wall 1098 is coupled to an outer edge of the eighth layer portion 1088 and extends substantially perpendicular to the eighth layer portion 1088.

Intermediate Isolation Layer 804

Figure 27:
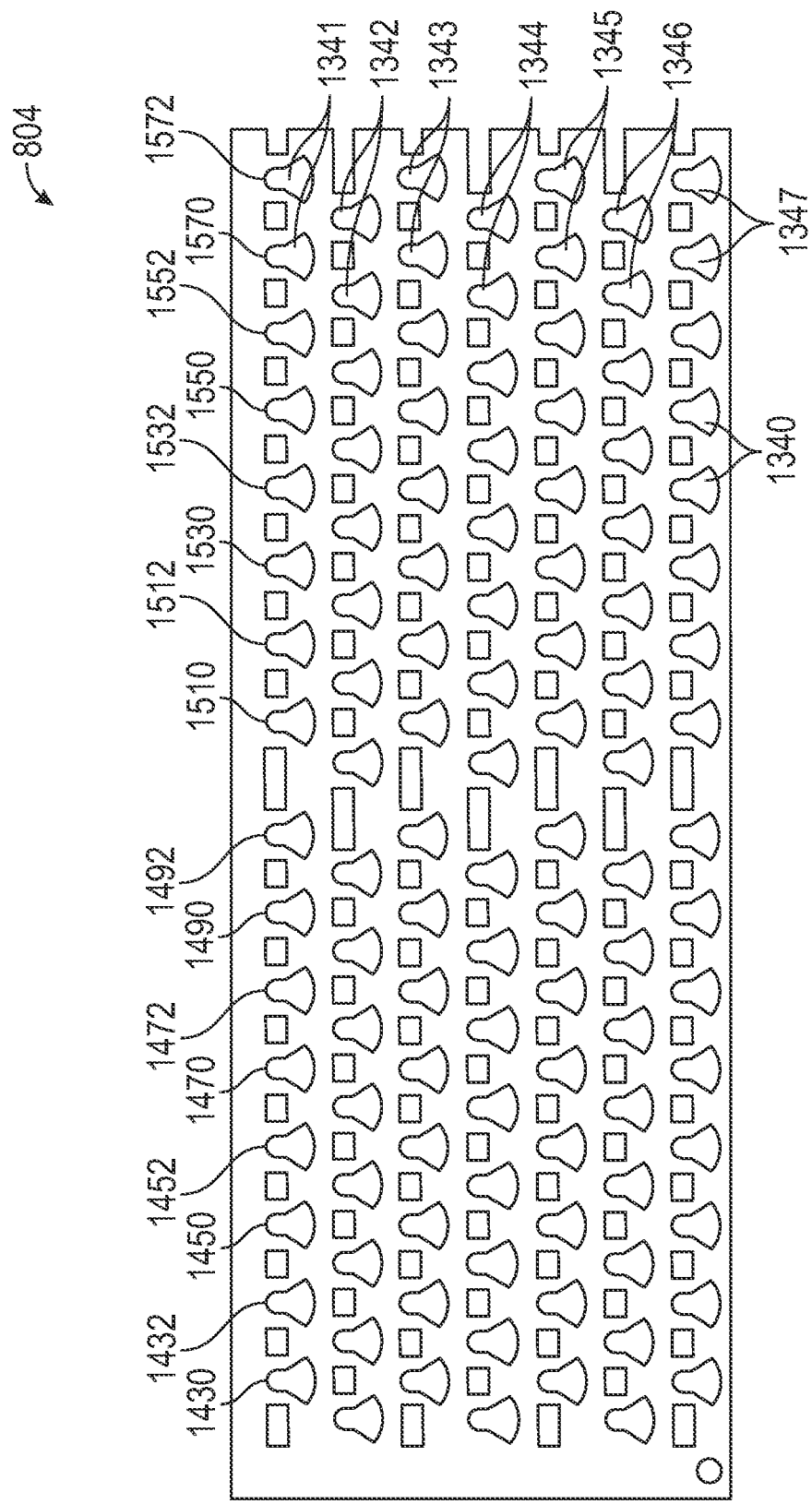
FIG. 27 is a top view of an intermediate isolation layer utilized in the laminated busbar assembly of FIG. 18.

Referring to FIGS. 4, 14, 22 and 27, the intermediate isolation layer 804 is disposed against and contacts the first busbar layer 802. In an exemplary embodiment, the intermediate isolation layer 804 is constructed of an electrically insulative material. Referring to FIG. 27, the intermediate isolation layer 804 includes a plurality of apertures 1340 extending therethrough. In particular, the plurality of apertures 1340 include a first row of apertures 1341, a second row of apertures 1342, a third row of apertures 1343, a fourth row of apertures 1344, a fifth row of apertures 1345, a sixth row of apertures 1346, and a seventh row of apertures 1347—that align with the first row of apertures 1101, the second row of apertures 1102, the third row of apertures 1103, the fourth row of apertures 1104, the fifth row of apertures 1105, the sixth row of apertures 1106, and the seventh row of apertures 1107 of the first busbar layer 802 (shown in FIG. 26).

For purposes of simplicity, only the first row of apertures 1341 will be discussed hereinafter. In particular, the first row of apertures 1341 includes apertures 1430, 1432, 1450, 1452, 1470, 1472, 1490, 1492, 1510, 1512, 1530, 1532, 1550, 1552, 1570, 1572.

Referring to FIGS. 27 and 35, since the shape of each of the apertures in the plurality of apertures 1340 are identical, only the shape of the aperture 1430 will be discussed in greater detail below. In particular, the aperture 1430 has a circular aperture portion 1590 and a skirt-shaped aperture portion 1592 communicating with the circular aperture portion 1590. As will be discussed in greater detail below, the circular aperture portion 1590 communicates with a positive electrode of the cylindrical battery cell 530, and the skirt-shaped portion 1592 communicates with a portion of the first busbar layer 802 that is coupled to a negative electrode of the cylindrical battery cell 530 that is exposed through the skirt-shaped aperture portion 1592.

Referring to FIGS. 14, 22, and 27, for purposes of simplicity, a brief explanation of how the cylindrical battery cells in the first row of battery cells 501 communicate with the intermediate isolation layer 804 will be explained.

The aperture 1430 in the intermediate isolation layer 804 is sized and shaped to receive a positive electrode of the cylindrical battery cell 530 therethrough, and to expose a portion of the first busbar layer 802 contacting a negative electrode of the cylindrical battery cell 530.

The aperture 1432 is sized and shaped to receive a positive electrode of the cylindrical battery cell 532 therethrough, and to expose a portion of the first busbar layer 802 contacting the negative electrode of the cylindrical battery cell 532.

The aperture 1450 is sized and shaped to receive a positive electrode of the cylindrical battery cell 550 therethrough, and to expose a portion of the first busbar layer 802 contacting the negative electrode of the cylindrical battery cell 550.

The aperture 1452 is sized and shaped to receive a positive electrode of the cylindrical battery cell 552 therethrough, and to expose a portion of the first busbar layer 802 contacting the negative electrode of the cylindrical battery cell 552.

The aperture 1470 is sized and shaped to receive a positive electrode of the cylindrical battery cell 570 therethrough, and to expose a portion of the first busbar layer 802 contacting the negative electrode of the cylindrical battery cell 570.

The aperture 1472 is sized and shaped to receive a positive electrode of the cylindrical battery cell 572 therethrough, and to expose a portion of the first busbar layer 802 contacting the negative electrode of the cylindrical battery cell 572.

The aperture 1490 is sized and shaped to receive a positive electrode of the cylindrical battery cell 590 therethrough, and to expose a portion of the first busbar layer 802 contacting the negative electrode of the cylindrical battery cell 590.

The aperture 1492 is sized and shaped to receive a positive electrode of the cylindrical battery cell 592 therethrough, and to expose a portion of the first busbar layer 802 contacting the negative electrode of the cylindrical battery cell 592.

The aperture 1510 is sized and shaped to receive a positive electrode of the cylindrical battery cell 610 therethrough, and to expose a portion of the first busbar layer 802 contacting the negative electrode of the cylindrical battery cell 610.

The aperture 1512 is sized and shaped to receive a positive electrode of the cylindrical battery cell 612 therethrough, and to expose a portion of the first busbar layer 802 contacting the negative electrode of the cylindrical battery cell 612.

The aperture 1530 is sized and shaped to receive a positive electrode of the cylindrical battery cell 630 therethrough, and to expose a portion of the first busbar layer 802 contacting the negative electrode of the cylindrical battery cell 630.

The aperture 1532 is sized and shaped to receive a positive electrode of the cylindrical battery cell 632 therethrough, and to expose a portion of the first busbar layer 802 contacting the negative electrode of the cylindrical battery cell 632.

The aperture 1550 is sized and shaped to receive a positive electrode of the cylindrical battery cell 650 therethrough, and to expose a portion of the first busbar layer 802 contacting the negative electrode of the cylindrical battery cell 650.

The aperture 1552 is sized and shaped to receive a positive electrode of the cylindrical battery cell 652 therethrough, and to expose a portion of the first busbar layer 802 contacting the negative electrode of the cylindrical battery cell 652.

The aperture 1570 is sized and shaped to receive a positive electrode of the cylindrical battery cell 670 therethrough, and to expose a portion of the first busbar layer 802 contacting the negative electrode of the cylindrical battery cell 670.

The aperture 1572 is sized and shaped to receive a positive electrode of the cylindrical battery cell 672 therethrough, and to expose a portion of the first busbar layer 802 contacting the negative electrode of the cylindrical battery cell 672.

Second Busbar Layer

Figure 28:
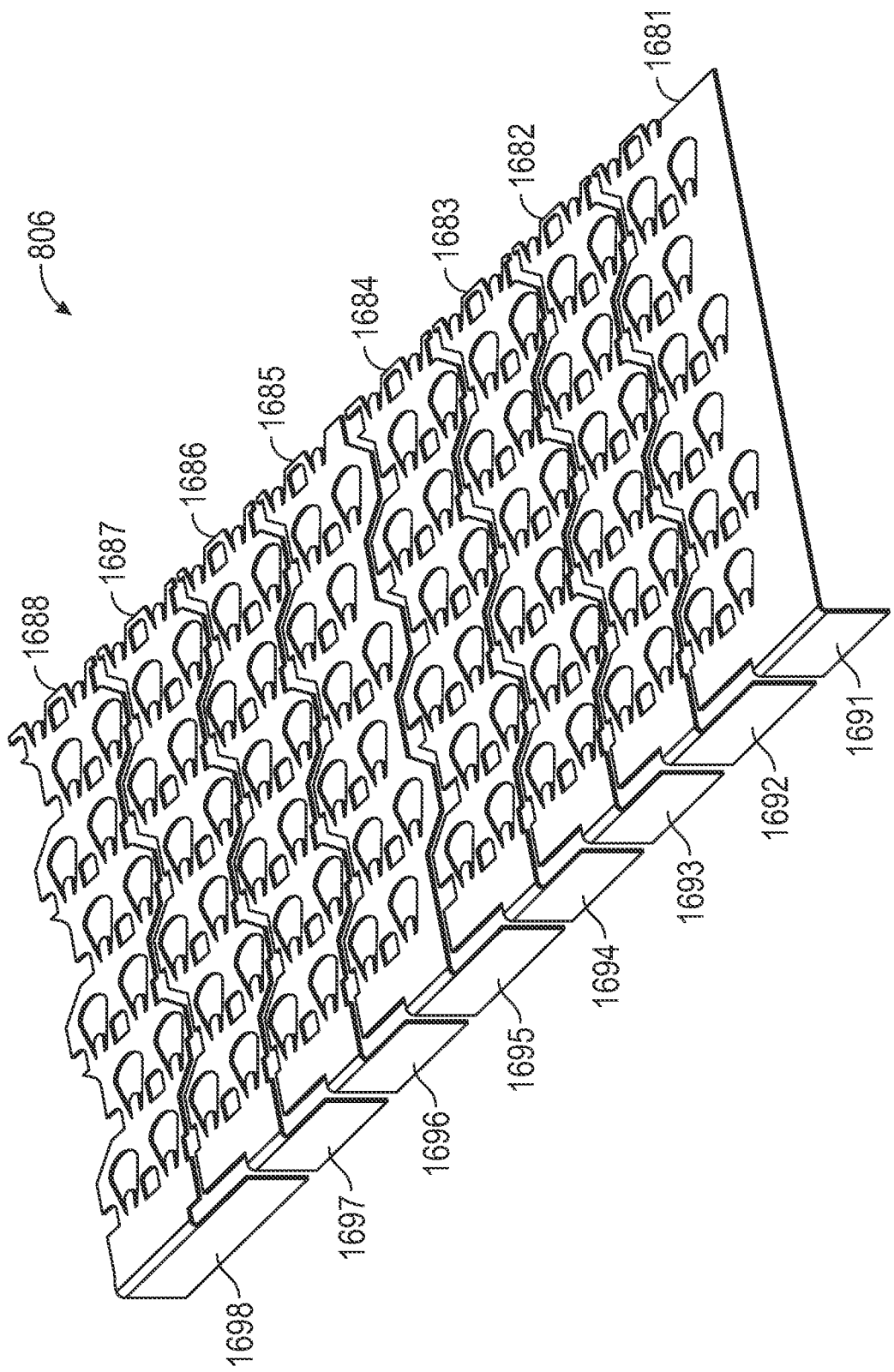
FIG. 28 is an isometric view of a second busbar layer utilized in the laminated busbar assembly of FIG. 18 which is coupled to positive electrodes of a plurality of cylindrical battery cells.
Figure 29:
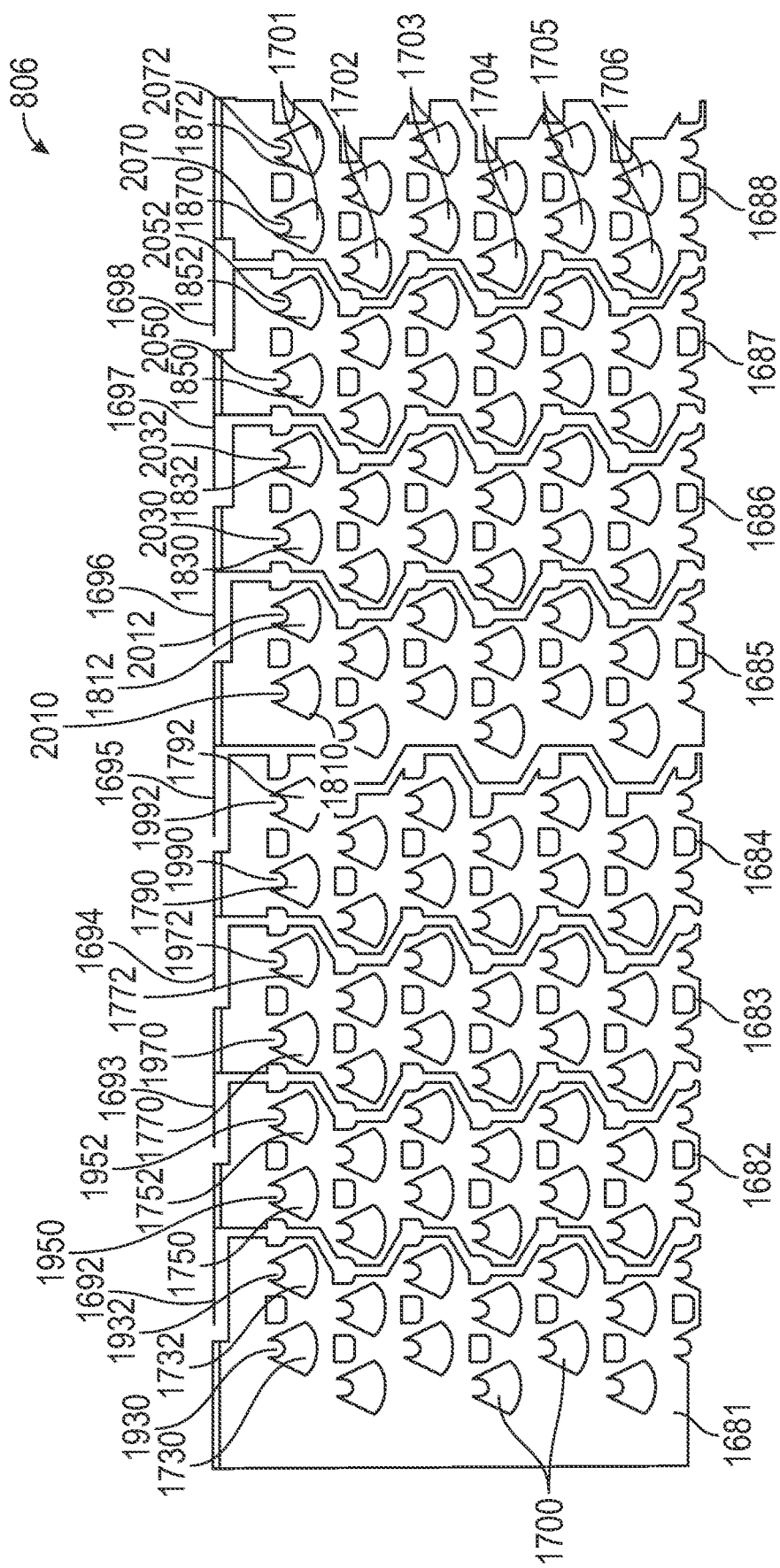
FIG. 29 is a top view of the second busbar layer of FIG. 28.

Referring to FIGS. 22, 28 and 29, the second busbar layer 806 is disposed against and contacts the intermediate isolation layer 804. The second busbar layer 806 includes a first layer portion 1681, a second layer portion 1682, a third layer portion 1683, a fourth layer portion 1684, a fifth layer portion 1685, a sixth layer portion 1686, a seventh layer portion 1687, and an eighth layer portion 1688. The second busbar layer 806 further includes a first outer side wall 1691, a second outer side wall 1692, a third outer side wall 1693, a fourth outer side wall 1694, a fifth outer side wall 1695, a sixth outer side wall 1696, a seventh outer side wall 1697, and an eighth outer side wall 1698.

Referring to FIG. 29, the first, second, third, fourth, fifth, sixth, seventh, eighth layer portions 1681, 1682, 1683, 1684, 1685, 1686, 1687, 1688 are spaced apart from one another and extend substantially parallel to one another. Further, each of the first, second, third, fourth, fifth, sixth, seventh, eighth layer portions 1681, 1682, 1683, 1684, 1685, 1686, 1687, 1688 are constructed of an electrically conductive metal.

The second busbar layer 806 includes a plurality of apertures 1700 extending therethrough. The plurality of apertures 1700 includes a first row of apertures 1701, a second row of apertures 1702, a third row of apertures 1703, a fourth row of apertures 1704, a fifth row of apertures 1705, and a sixth row apertures 1706—which align with the first row of apertures 1341, the second row of apertures 1342, the third row of apertures 1343, the fourth row of apertures 1344, the fifth row of apertures 1345, and the sixth row of apertures 1346 of the intermediate isolation layer 804 (shown in FIG. 27). Each of the apertures in each row of apertures in the second busbar layer 806 are spaced apart from one another. For purposes of simplicity, only the first row of apertures 1701 will be discussed in greater detail herein. The first row of apertures 1701 includes apertures 1730, 1732, 1750, 1752, 1770, 1772, 1790, 1792, 1810, 1812, 1830, 1832, 1850, 1852, 1870, 1872.

First Layer Portion

Referring to FIGS. 14 and 29, the first layer portion 1681 includes the apertures 1730, 1732 extending therethrough. The aperture 1730 defines a tab 1930 that contacts a positive electrode of the cylindrical battery cell 530. Further, the aperture 1730 exposes a portion of the first busbar layer 802 proximate to the aperture 1130 (shown in FIG. 26) that contacts a negative electrode of the cylindrical battery cell 530. The aperture 1732 defines a tab 1932 that contacts a positive electrode of the cylindrical battery cell 532. Further, the aperture 1732 exposes a portion of the first busbar layer 802 proximate to the aperture 1132 (shown in FIG. 26) that contacts a negative electrode of the cylindrical battery cell 532. The cylindrical battery cells 530, 532 are electrically coupled in parallel to one another utilizing the first layer portion 1681 and the first layer portion 1081 (shown in FIG. 26).

Second Layer Portion

The second layer portion 1682 includes the apertures 1750, 1752 extending therethrough. The aperture 1750 defines a tab 1950 that contacts a positive electrode of the cylindrical battery cell 550. Further, the aperture 1750 exposes a portion of the first busbar layer 802 proximate to the aperture 1150 (shown in FIG. 26) that contacts a negative electrode of the cylindrical battery cell 550. The aperture 1752 defines a tab 1952 that contacts a positive electrode of the cylindrical battery cell 552. Further, the aperture 1752 exposes a portion of the first busbar layer 802 proximate to the aperture 1152 (shown in FIG. 26) that contacts a negative electrode of the cylindrical battery cell 552. The cylindrical battery cells 550, 552 are electrically coupled in parallel to one another utilizing the second layer portion 1682 and the second layer portion 1082 (shown in FIG. 26).

Third Layer Portion

The third layer portion 1683 includes the apertures 1770, 1772 extending therethrough. The aperture 1770 defines a tab 1970 that contacts a positive electrode of the cylindrical battery cell 570. Further, the aperture 1770 exposes a portion of the first busbar layer 802 proximate to the aperture 1170 (shown in FIG. 26) that contacts a negative electrode of the cylindrical battery cell 570. The aperture 1772 defines a tab 1972 that contacts a positive electrode of the cylindrical battery cell 572. Further, the aperture 1772 exposes a portion of the first busbar layer 802 proximate to the aperture 1172 (shown in FIG. 26) that contacts a negative electrode of the cylindrical battery cell 572. The cylindrical battery cells 570, 572 are electrically coupled in parallel to one another utilizing the third layer portion 1683 and the third layer portion 1083 (shown in FIG. 26).

Fourth Layer Portion

The fourth layer portion 1684 includes the apertures 1790, 1792 extending therethrough. The aperture 1790 defines a tab 1990 that contacts a positive electrode of the cylindrical battery cell 590. Further, the aperture 1790 exposes a portion of the first busbar layer 802 proximate to the aperture 1190 (shown in FIG. 26) that contacts a negative electrode of the cylindrical battery cell 590. The aperture 1792 defines a tab 1992 that contacts a positive electrode of the cylindrical battery cell 592. Further, the aperture 1792 exposes a portion of the first busbar layer 802 proximate to the aperture 1192 (shown in FIG. 26) that contacts a negative electrode of the cylindrical battery cell 592. The cylindrical battery cells 590, 592 are electrically coupled in parallel to one another utilizing the fourth layer portion 1684 and the fourth layer portion 1084 (shown in FIG. 26).

Fifth Layer Portion

The fifth layer portion 1685 includes the apertures 1810, 1812 extending therethrough. The aperture 1810 defines a tab 2010 that contacts a positive electrode of the cylindrical battery cell 610. Further, the aperture 1810 exposes a portion of the first busbar layer 802 proximate to the aperture 1210 (shown in FIG. 26) that contacts a negative electrode of the cylindrical battery cell 610. The aperture 1812 defines a tab 2012 that contacts a positive electrode of the cylindrical battery cell 612. Further, the aperture 1812 exposes a portion of the first busbar layer 802 proximate to the aperture 1212 (shown in FIG. 26) that contacts a negative electrode of the cylindrical battery cell 612. The cylindrical battery cells 610, 612 are electrically coupled in parallel to one another utilizing the fifth layer portion 1685 and the fifth layer portion 1085 (shown in FIG. 26).

Sixth Layer Portion

The sixth layer portion 1686 includes the apertures 1830, 1832 extending therethrough. The aperture 1830 defines a tab 2030 that contacts a positive electrode of the cylindrical battery cell 630. Further, the aperture 1830 exposes a portion of the first busbar layer 802 proximate to the aperture 1230 (shown in FIG. 26) that contacts a negative electrode of the cylindrical battery cell 630. The aperture 1832 defines a tab 2032 that contacts a positive electrode of the cylindrical battery cell 632. Further, the aperture 1832 exposes a portion of the first busbar layer 802 proximate to the aperture 1232 (shown in FIG. 26) that contacts a negative electrode of the cylindrical battery cell 632. The cylindrical battery cells 630, 632 are electrically coupled in parallel to one another utilizing the sixth layer portion 1686 and the sixth layer portion 1086 (shown in FIG. 26).

Seventh Layer Portion

The seventh layer portion 1687 includes the apertures 1850, 1852 extending therethrough. The aperture 1850 defines a tab 2050 that contacts a positive electrode of the cylindrical battery cell 650. Further, the aperture 1850 exposes a portion of the first busbar layer 802 proximate to the aperture 1250 (shown in FIG. 26) that contacts a negative electrode of the cylindrical battery cell 650. The aperture 1852 defines a tab 2052 that contacts a positive electrode of the cylindrical battery cell 652. Further, the aperture 1852 exposes a portion of the first busbar layer 802 proximate to the aperture 1252 (shown in FIG. 26) that contacts a negative electrode of the cylindrical battery cell 652. The cylindrical battery cells 650, 652 are electrically coupled in parallel to one another utilizing the seventh layer portion 1687 and the seventh layer portion 1087 (shown in FIG. 26).

Eighth Layer Portion

The eighth layer portion 1688 includes the apertures 1870, 1872 extending therethrough. The aperture 1870 defines a tab 2070 that contacts a positive electrode of the cylindrical battery cell 670. Further, the aperture 1870 exposes a portion of the first busbar layer 802 proximate to the aperture 1270 (shown in FIG. 26) that contacts a negative electrode of the cylindrical battery cell 670. The aperture 1872 defines a tab 2072 that contacts a positive electrode of the cylindrical battery cell 672. Further, the aperture 1872 exposes a portion of the first busbar layer 802 proximate to the aperture 1272 (shown in FIG. 26) that contacts a negative electrode of the cylindrical battery cell 672. The cylindrical battery cells 670, 672 are electrically coupled in parallel to one another utilizing the eighth layer portion 1688 and the eighth layer portion 1088 (shown in FIG. 26).

Outer Side Walls

Referring to FIGS. 28 and 29, the first outer side wall 1691, the second outer side wall 1692, the third outer side wall 1693, the fourth outer side wall 1694, the fifth outer side wall 1695, the sixth outer side wall 1696, the seventh outer side wall 1697, and the eighth outer side wall 1698 are constructed of an electrically conductive material.

The first outer side wall 1691 is coupled to the first layer portion 1681 and extends substantially perpendicular to the first layer portion 1681.

The second outer side wall 1692 is coupled to the second layer portion 1682 and extends substantially perpendicular to the second layer portion 1682. The second outer side wall 1692 is coupled to the outer side wall 1091 (shown in FIG. 26) of the first busbar layer 802 to electrically couple the parallel combination of cylindrical battery cells 530, 532 in series with the parallel combination of cylindrical battery cells 550, 552.

The third outer side wall 1693 is coupled to the third layer portion 1683 and extends substantially perpendicular to the third layer portion 1683. The third outer side wall 1693 is coupled to the outer side wall 1092 (shown in FIG. 26) of the first busbar layer 802 to electrically couple the parallel combination of cylindrical battery cells 550, 552 in series with the parallel combination of cylindrical battery cells 570, 572.

The fourth outer side wall 1694 is coupled to the fourth layer portion 1684 and extends substantially perpendicular to the fourth layer portion 1684. The fourth outer side wall 1694 is coupled to the outer side wall 1093 (shown in FIG. 26) of the first busbar layer 802 to electrically couple the parallel combination of cylindrical battery cells 570, 572 in series with the parallel combination of cylindrical battery cells 590, 592.

The fifth outer side wall 1695 is coupled to the fifth layer portion 1685 and extends substantially perpendicular to the fifth layer portion 1685. The fifth outer side wall 1695 is coupled to the outer side wall 1094 (shown in FIG. 26) of the first busbar layer 802 to electrically couple the parallel combination of cylindrical battery cells 590, 592 in series with the parallel combination of cylindrical battery cells 610, 612.

The sixth outer side wall 1696 is coupled to the sixth layer portion 1686 and extends substantially perpendicular to the sixth layer portion 1686. The sixth outer side wall 1696 is coupled to the outer side wall 1095 (shown in FIG. 26) of the first busbar layer 802 to electrically couple the parallel combination of cylindrical battery cells 610, 612 in series with the parallel combination of cylindrical battery cells 630, 632.

The seventh outer side wall 1697 is coupled to the seventh layer portion 1687 and extends substantially perpendicular to the seventh layer portion 1687. The seventh outer side wall 1697 is coupled to the outer side wall 1096 (shown in FIG. 26) of the first busbar layer 802 to electrically couple the parallel combination of cylindrical battery cells 630, 632 in series with the parallel combination of cylindrical battery cells 650, 652.

The eighth outer side wall 1698 is coupled to the eighth layer portion 1688 and extends substantially perpendicular to the eighth layer portion 1688. The eighth outer side wall 1698 is coupled to the outer side wall 1097 (shown in FIG. 26) of the first busbar layer 802 to electrically couple the parallel combination of cylindrical battery cells 650, 652 in series with the parallel combination of cylindrical battery cells 670, 672.

Top Isolation Layer

Figure 30:
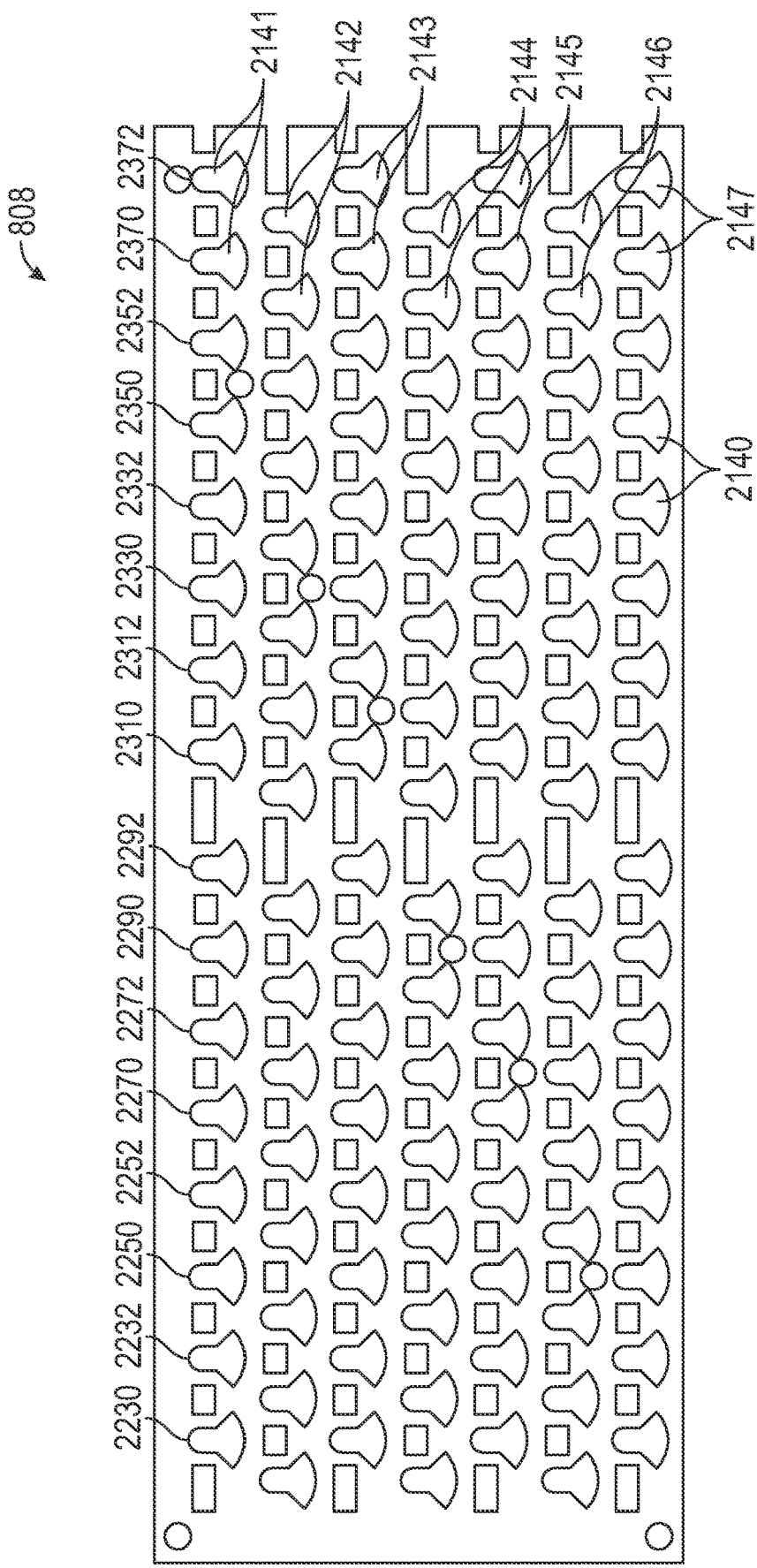
FIG. 30 is a top view of a top isolation layer utilized in the laminated busbar assembly of FIG. 18.

Referring to FIGS. 14, 22 and 30, the top isolation layer 808 is disposed against and contacts the second busbar layer 806. In an exemplary embodiment, the top isolation layer 808 is constructed of an electrically insulative material. Referring to FIG. 30, the top isolation layer 808 includes a plurality of apertures 2140 extending therethrough. In particular, the plurality of apertures 2140 include a first row of apertures 2141, a second row of apertures 2142, a third row of apertures 2143, a fourth row of apertures 2144, a fifth row of apertures 2145, a sixth row of apertures 2146, and a seventh row of apertures 2147. The first row of apertures 2141, the second row of apertures 2142, the third row of apertures 2143, the fourth row of apertures 2144, the fifth row of apertures 2145, and the sixth row of apertures 2146—align with the first row of apertures 1701, the second row of apertures 1702, the third row of apertures 1703, the fourth row of apertures 1704, the fifth row of apertures 1705, and the sixth row of apertures 1706 of the second busbar layer 806 (shown in FIG. 29).

For purposes of simplicity, only the first row of apertures 2141 will be discussed hereinafter. In particular, the first row of apertures 2141 includes apertures 2230, 2232, 2250, 2252, 2270, 2272, 2290, 2292, 2310, 2312, 2330, 2332, 2350, 2352, 2370, 2372.

Referring to FIGS. 30 and 36, since the shape of each of the apertures in the plurality of apertures 2140 are identical, only the shape of the aperture 2230 will be discussed in greater detail below. In particular, the aperture 2230 has a circular aperture portion 2390 and a skirt-shaped aperture portion 2392 communicating with the circular aperture portion 2390.

Referring to FIGS. 29 and 30, the aperture 2230 in the intermediate isolation layer 804 is aligned with the aperture 1730 in the second busbar layer 806. Further, the aperture 2232 in the intermediate isolation layer 804 is aligned with the aperture 1732 in the second busbar layer 806.

The aperture 2250 in the intermediate isolation layer 804 is aligned with the aperture 1750 in the second busbar layer 806. Further, the aperture 2252 in the intermediate isolation layer 804 is aligned with the aperture 1752 in the second busbar layer 806.

The aperture 2270 in the intermediate isolation layer 804 is aligned with the aperture 1770 in the second busbar layer 806. Further, the aperture 2272 in the intermediate isolation layer 804 is aligned with the aperture 1772 in the second busbar layer 806.

The aperture 2290 in the intermediate isolation layer 804 is aligned with the aperture 1790 in the second busbar layer 806. Further, the aperture 2292 in the intermediate isolation layer 804 is aligned with the aperture 1792 in the second busbar layer 806.

The aperture 2310 in the intermediate isolation layer 804 is aligned with the aperture 1810 in the second busbar layer 806. Further, the aperture 2312 in the intermediate isolation layer 804 is aligned with the aperture 1812 in the second busbar layer 806.

The aperture 2330 in the intermediate isolation layer 804 is aligned with the aperture 1830 in the second busbar layer 806. Further, the aperture 2332 in the intermediate isolation layer 804 is aligned with the aperture 1832 in the second busbar layer 806.

The aperture 2350 in the intermediate isolation layer 804 is aligned with the aperture 1850 in the second busbar layer 806. Further, the aperture 2352 in the intermediate isolation layer 804 is aligned with the aperture 1852 in the second busbar layer 806.

The aperture 2370 in the intermediate isolation layer 804 is aligned with the aperture 1870 in the second busbar layer 806. Further, the aperture 2372 in the intermediate isolation layer 804 is aligned with the aperture 1872 in the second busbar layer 806.

Sensor Layer

Figure 31:
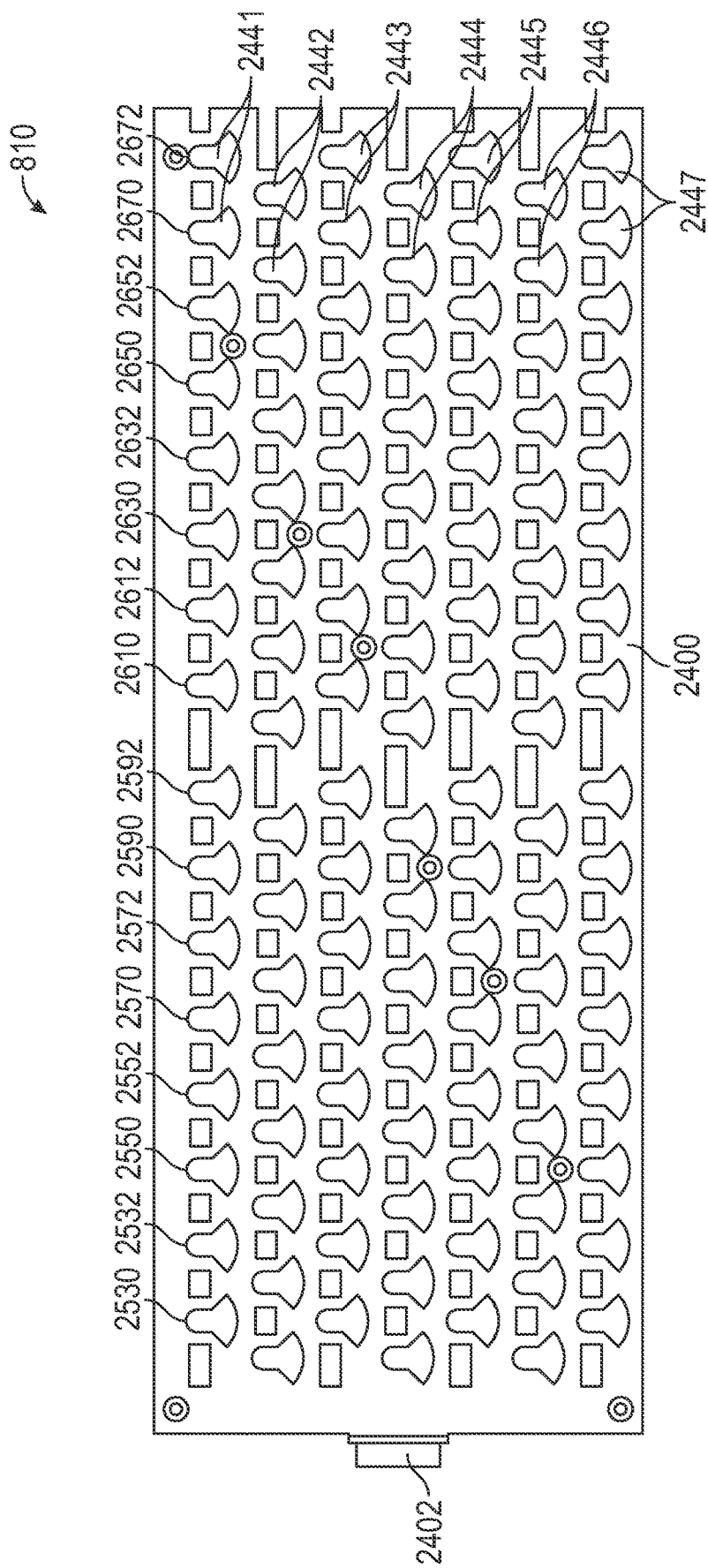
FIG. 31 is a top view of a sensor layer utilized in the laminated busbar assembly of FIG. 18.
Figure 32:
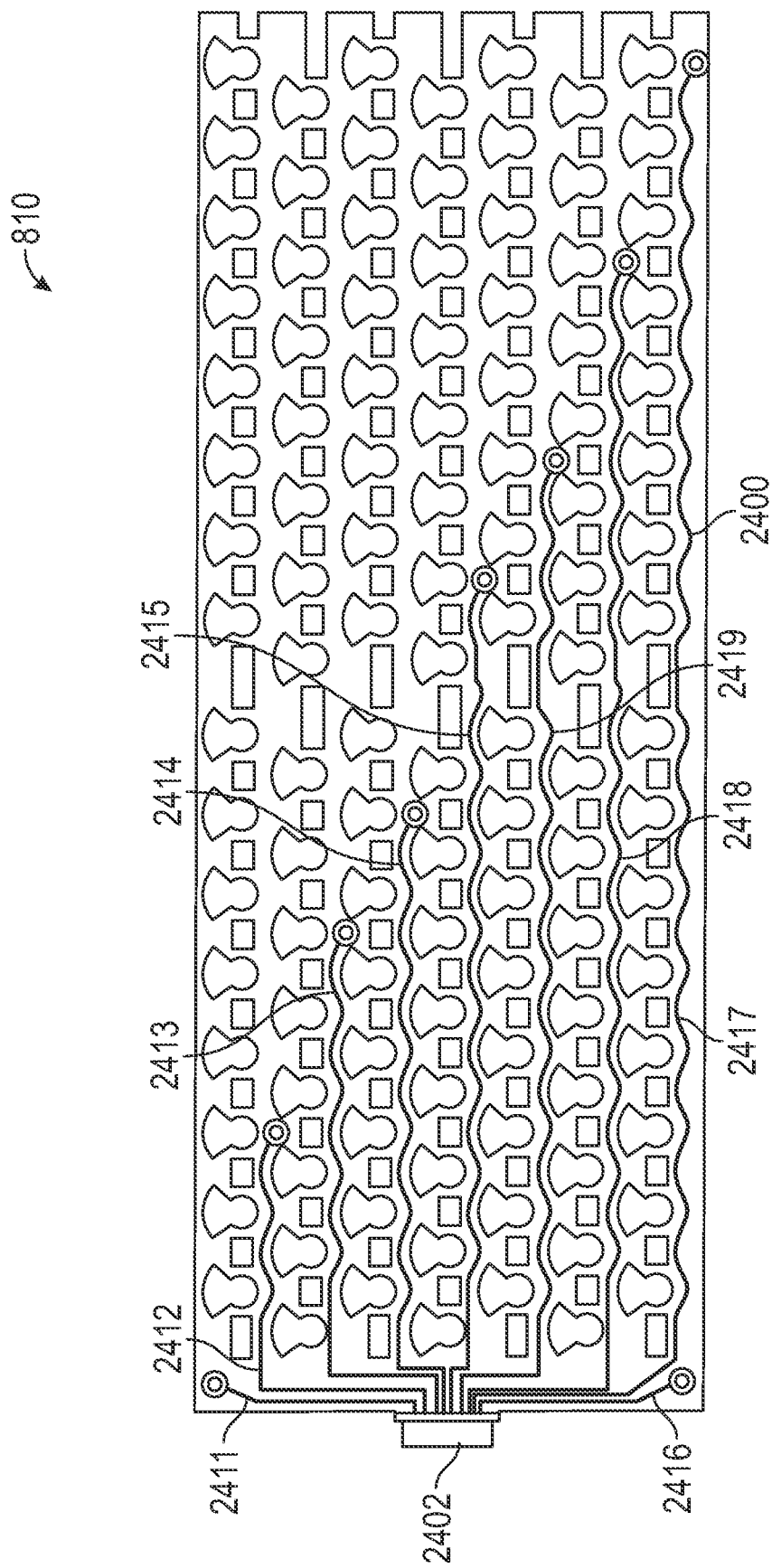
FIG. 32 is a bottom view of the sensor layer of FIG. 31.
Figure 39:
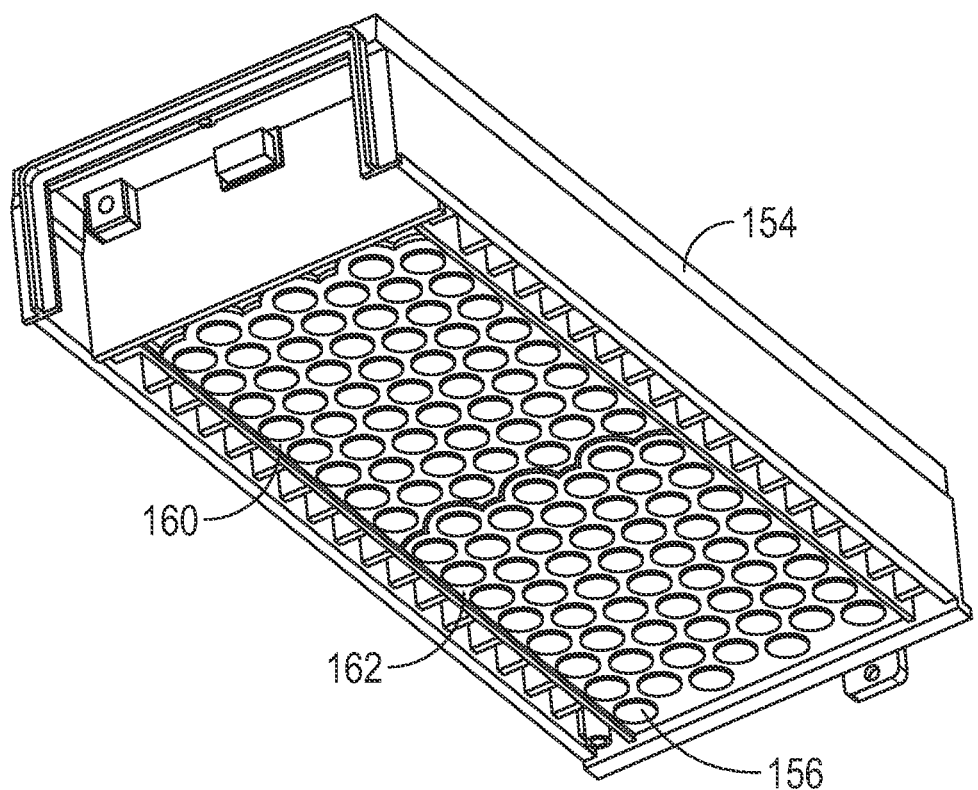
FIG. 39 is another isometric view of the second retention housing, the plurality of cylindrical battery cells, the first and second retaining plates of FIG. 38.
Figure 40:
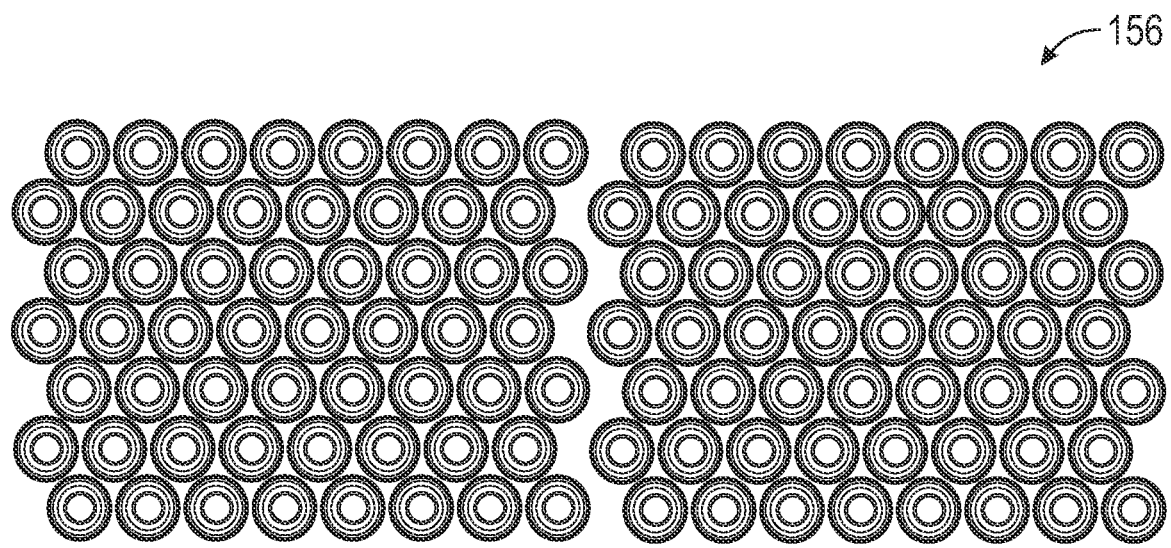
FIG. 40 is a top view of the plurality of cylindrical battery cells of FIG. 39.

Referring to FIGS. 22, 29, and 31, the sensor layer 810 is disposed against and contacts the top isolation layer 808. In an exemplary embodiment, the sensor layer 810 includes an electrically insulative substrate 2400, an electrical connector 2402, and electrical traces 2411, 2412, 2413, 2414, 2415, 2416, 2417, 2418, 2419. Each of the electrical traces 2411-2410 are electrically coupled to distinct locations on the second busbar layer 806, and to the electrical connector 2402.

The sensor layer 810 includes a plurality of apertures 2400 extending through the substrate 2400. In particular, the plurality of apertures 2400 include a first row of apertures 2441, a second row of apertures 2442, a third row of apertures 2443, a fourth row of apertures 2444, a fifth row of apertures 2445, a sixth row of apertures 2446, and a seventh row of apertures 2447.

For purposes of simplicity, only the first row of apertures 2441 will be discussed hereinafter. In particular, the first row of apertures 2441 includes apertures 2530, 2532, 2550, 2552, 2570, 2572, 2590, 2592, 2610, 2612, 2630, 2632, 2650, 2652, 2670, 2672.

Referring to FIGS. 14, 26, 29, and 31, for purposes of understanding, a brief explanation of how the apertures in the sensor layer 810 align and expose the tabs in the second busbar layer 806 that contact the positive electrodes of the plurality of cylindrical battery cells 56, and further align and expose a portion of the first busbar layer 802 that contact the negative electrodes of the plurality of cylindrical battery cells 56 will be provided.

The aperture 2530 is sized and shaped to expose a tab 1930 (shown in FIG. 29) of the second busbar layer 806 contacting the positive electrode of the cylindrical battery cell 530, and to expose a portion of the first busbar layer 802 proximate to an aperture 1130 (shown in FIG. 26) contacting the negative electrode of the cylindrical battery cell 530.

The aperture 2532 is sized and shaped to expose a tab 1932 (shown in FIG. 29) of the second busbar layer 806 contacting the positive electrode of the cylindrical battery cell 532, and to expose a portion of the first busbar layer 802 proximate to an aperture 1132 (shown in FIG. 26) contacting the negative electrode of the cylindrical battery cell 532.

The aperture 2550 is sized and shaped to expose a tab 1950 (shown in FIG. 29) of the second busbar layer 806 contacting the positive electrode of the cylindrical battery cell 550, and to expose a portion of the first busbar layer 802 proximate to an aperture 1150 (shown in FIG. 26) contacting the negative electrode of the cylindrical battery cell 550.

The aperture 2552 is sized and shaped to expose a tab 1952 (shown in FIG. 29) of the second busbar layer 806 contacting the positive electrode of the cylindrical battery cell 552, and to expose a portion of the first busbar layer 802 proximate to an aperture 1152 (shown in FIG. 26) contacting the negative electrode of the cylindrical battery cell 552.

The aperture 2570 is sized and shaped to expose a tab 1970 (shown in FIG. 29) of the second busbar layer 806 contacting the positive electrode of the cylindrical battery cell 570, and to expose a portion of the first busbar layer 802 proximate to an aperture 1170 (shown in FIG. 26) contacting the negative electrode of the cylindrical battery cell 570.

The aperture 2572 is sized and shaped to expose a tab 1972 (shown in FIG. 29) of the second busbar layer 806 contacting the positive electrode of the cylindrical battery cell 572, and to expose a portion of the first busbar layer 802 proximate to an aperture 1172 (shown in FIG. 26) contacting the negative electrode of the cylindrical battery cell 572.

The aperture 2590 is sized and shaped to expose a tab 1990 (shown in FIG. 29) of the second busbar layer 806 contacting the positive electrode of the cylindrical battery cell 590, and to expose a portion of the first busbar layer 802 proximate to an aperture 1190 (shown in FIG. 26) contacting the negative electrode of the cylindrical battery cell 590.

The aperture 2592 is sized and shaped to expose a tab 1992 (shown in FIG. 29) of the second busbar layer 806 contacting the positive electrode of the cylindrical battery cell 592, and to expose a portion of the first busbar layer 802 proximate to an aperture 1192 (shown in FIG. 26) contacting the negative electrode of the cylindrical battery cell 592.

The aperture 2610 is sized and shaped to expose a tab 2010 (shown in FIG. 29) of the second busbar layer 806 contacting the positive electrode of the cylindrical battery cell 610, and to expose a portion of the first busbar layer 802 proximate to an aperture 1210 (shown in FIG. 26) contacting the negative electrode of the cylindrical battery cell 610.

The aperture 2612 is sized and shaped to expose a tab 2012 (shown in FIG. 29) of the second busbar layer 806 contacting the positive electrode of the cylindrical battery cell 612, and to expose a portion of the first busbar layer 802 proximate to an aperture 1212 (shown in FIG. 26) contacting the negative electrode of the cylindrical battery cell 612.

The aperture 2630 is sized and shaped to expose a tab 2030 (shown in FIG. 29) of the second busbar layer 806 contacting the positive electrode of the cylindrical battery cell 630, and to expose a portion of the first busbar layer 802 proximate to an aperture 1230 (shown in FIG. 26) contacting the negative electrode of the cylindrical battery cell 630.

The aperture 2632 is sized and shaped to expose a tab 2032 (shown in FIG. 29) of the second busbar layer 806 contacting the positive electrode of the cylindrical battery cell 632, and to expose a portion of the first busbar layer 802 proximate to an aperture 1232 (shown in FIG. 26) contacting the negative electrode of the cylindrical battery cell 632.

The aperture 2650 is sized and shaped to expose a tab 2050 (shown in FIG. 29) of the second busbar layer 806 contacting the positive electrode of the cylindrical battery cell 650, and to expose a portion of the first busbar layer 802 proximate to an aperture 1250 (shown in FIG. 26) contacting the negative electrode of the cylindrical battery cell 650.

The aperture 2652 is sized and shaped to expose a tab 2052 (shown in FIG. 29) of the second busbar layer 806 contacting the positive electrode of the cylindrical battery cell 652, and to expose a portion of the first busbar layer 802 proximate to an aperture 1252 (shown in FIG. 26) contacting the negative electrode of the cylindrical battery cell 652.

The aperture 2670 is sized and shaped to expose a tab 2070 (shown in FIG. 29) of the second busbar layer 806 contacting the positive electrode of the cylindrical battery cell 670, and to expose a portion of the first busbar layer 802 proximate to an aperture 1270 (shown in FIG. 26) contacting the negative electrode of the cylindrical battery cell 670.

The aperture 2672 is sized and shaped to expose a tab 2072 (shown in FIG. 29) of the second busbar layer 806 contacting the positive electrode of the cylindrical battery cell 672, and to expose a portion of the first busbar layer 802 proximate to an aperture 1272 (shown in FIG. 26) contacting the negative electrode of the cylindrical battery cell 672.

In the laminated busbar assembly 68, a tab of the second busbar layer 806 is exposed (e.g., viewable from above the assembly 68) such that a welding tool (not shown) can contact and weld the tab to a respective positive electrode of the cylindrical battery cell. Further, it is noted that a portion of the first busbar layer 802 contacting a negative electrode of the cylindrical battery cell is exposed such that respective portion of the first busbar layer 802 can be welded to the negative electrode of the cylindrical battery cell.

Second Retention Housing

Referring to FIGS. 3 and 38-40, the second retention housing 154 holds the plurality of cylindrical battery cells 156 therein and on and against the central cooling portion 280 (shown in FIG. 4) such that the battery cells 156 thermally communicate central cooling portion 280. Further, the second retention housing 154 holds the laminated busbar assembly 168 thereon. Still further, the second retention housing 154 supports the retaining plates 160, 162 thereon. The second retention housing 154 is disposed within the second region 292 (shown in FIG. 4) defined by the central cooling portion 280 and the first and second exterior plates 141, 142. The structure of the second retention housing 154 is identical to the structure of the first retention housing 54. Further, the structure of the retaining plates 160, 162 are identical to the structure of retaining plates 60, 62, respectively. Further, the structure of the plurality of cylindrical battery cells 156 is identical to the structure of the plurality of cylindrical battery cells 56. Further, the structure of the laminated busbar assembly 168 is identical to the structure of the laminated busbar assembly 68.

First Outer Plate

Figure 2:
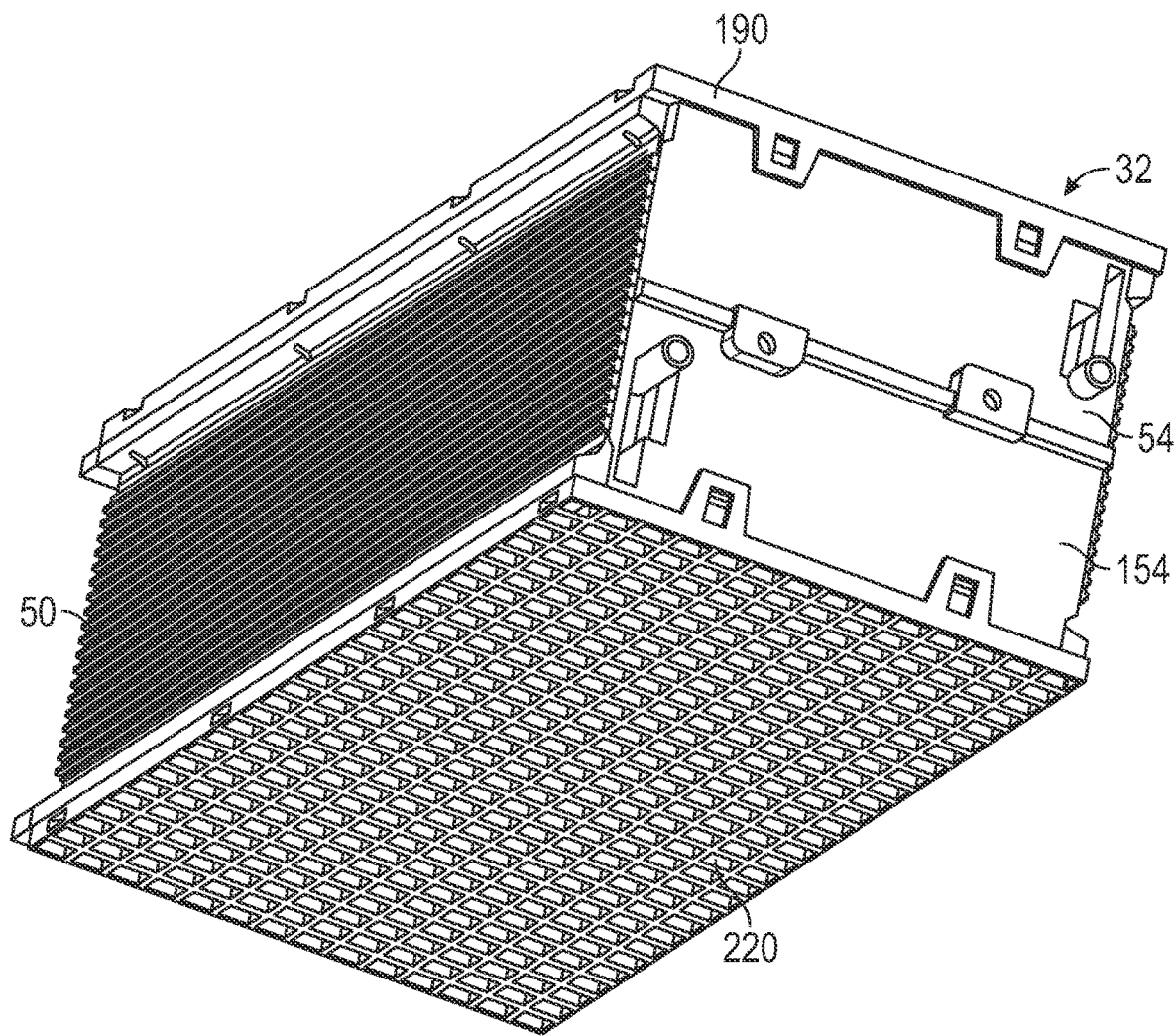
FIG. 2 is an isometric view of the battery module of FIG. 1.
Figure 3:
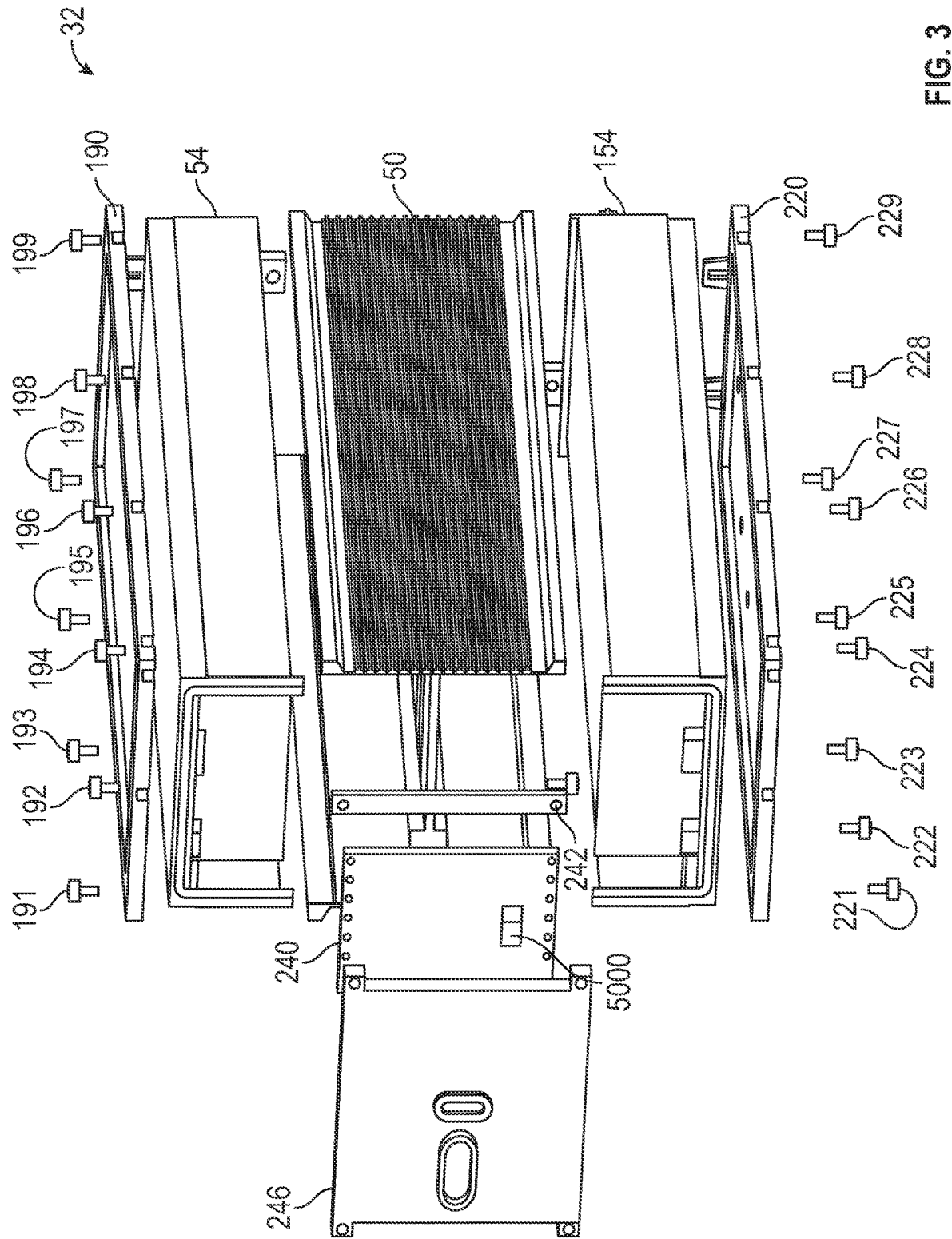
FIG. 3 is an exploded view of the battery module of FIG. 1.

Referring to FIGS. 2-4, the first outer plate 190 is coupled to the first retention housing 54 and the battery cell retention frame 50 utilizing the bolts 191, 192, 193, 194, 195, 196, 197, 198, 199. In an exemplary embodiment, the first outer plate 190 is constructed of plastic.

Second Outer Plate

The second outer plate 220 is coupled to the second retention housing 154 and the battery cell retention frame 50 utilizing the bolts 221, 222, 223, 224, 225, 226, 227, 228, 229. In an exemplary embodiment, the second outer plate 220 is constructed of plastic.

Circuit Board

Referring to FIGS. 3 and 31, the circuit board 240 includes a battery management controller 5000 that is electrically coupled to the electrical connector 2402 of the sensor layer 810 in the laminated busbar assembly 68 to monitor the operation of the plurality of cylindrical battery cells 56. Further, the battery management controller 5000 is electrically coupled to an electrical connector in a sensor layer in the laminated busbar assembly 168 to monitor the operation of the plurality of cylindrical battery cells 156. The circuit board 240 is coupled to an end of the first retention housing 54 and the second retention housing 154.

Electrical Bus Bar

The electrical busbar 242 is provided to electrically couple together the laminated busbar assemblies 68, 168. In particular, the electrical busbar 242 is electrically coupled to the laminated busbar assembly 68 (which is electrically coupled to the plurality of cylindrical battery cells 56) and to the laminated busbar assembly 168 (which is electrically coupled to the plurality of cylindrical battery cells 156).

Cover Plate

The cover plate 246 is attached to the first and second outer plates 190, 220 to cover the circuit board 240. In an exemplary embodiment, the cover plate 246 is constructed of plastic.

The battery module 32 provides a substantial advantage over other battery modules. In particular, the battery module 32 utilizes a laminated busbar assembly 68 that has a technical effect of electrically connecting cylindrical battery cells in a desired electrical configuration while having a relatively low height profile.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery, comprising:
a first cylindrical battery cell having a positive electrode and a negative electrode; and
a laminated busbar assembly having a bottom isolation layer, a first busbar layer, an intermediate isolation layer, and a second busbar layer;
the first busbar layer being coupled to and between the bottom isolation layer and the intermediate isolation layer;
the intermediate isolation layer being coupled to and between the first busbar layer and the second busbar layer;
the bottom isolation layer having a first aperture extending therethrough;
the first busbar layer having a first aperture extending therethrough, a portion of the first busbar layer proximate to the first aperture thereof being disposed against and electrically contacting the negative electrode of the first cylindrical battery cell;
the intermediate isolation layer having a first aperture extending therethrough,
the first busbar layer further having a conductive outer side wall that is coupled to and extending perpendicular to a first layer portion thereof; and
the second busbar layer further having a conductive outer side wall that is coupled to and extending perpendicular to a second layer portion thereof, and is further coupled to the conductive outer side wall of the first busbar layer.

2. The battery of claim 1, further comprising:
a second cylindrical battery cell having a positive electrode and a negative electrode;
the bottom isolation layer having a second aperture extending therethrough being sized and shaped to receive the positive electrode of the second cylindrical battery cell therethrough and to expose a portion of the negative electrode of the second cylindrical battery cell;
the first busbar layer having a second aperture extending therethrough being sized and shaped to receive the positive electrode of the second cylindrical battery cell therethrough, a portion of the first busbar layer proximate to the second aperture thereof being disposed against and electrically contacting the negative electrode of the second cylindrical battery cell;
the intermediate isolation layer having a second aperture extending therethrough being sized and shaped to receive the positive electrode of the second cylindrical battery cell therethrough; and
the second busbar layer being disposed against and electrically contacting the positive electrode of the second cylindrical battery cell, wherein the first and second cylindrical battery cells are electrically coupled in parallel to one another.

3. The battery of claim 2, wherein:
the first busbar layer has a first layer portion and a second layer portion being spaced apart from one another and electrically isolated from one another, the first and second apertures of the first busbar layer being through the first layer portion of the first busbar layer;
the second busbar layer has a first layer portion and a second layer portion being spaced apart from one another and electrically isolated from one another, the positive electrode of the first cylindrical battery cell and the positive electrode of the second cylindrical battery cell contacting the first layer portion of the second busbar layer; and the first layer portion of the first busbar layer is electrically coupled to the second layer portion of the second busbar layer.

4. The battery of claim 3, wherein:

the first busbar layer further has an outer side wall that is coupled to and extending perpendicular to the first layer portion thereof; and the second busbar layer further has an outer side wall that is coupled to and extending perpendicular to the second layer portion thereof, and is further coupled to the outer side wall of the first busbar layer.

5. The battery of claim 4, wherein:

a first busbar is coupled to the outer side wall of the first busbar layer and the outer side wall of the second busbar layer.

6. The battery of claim 3, further comprising:

a third cylindrical battery cell having a positive electrode and a negative electrode;

the bottom isolation layer having a third aperture extending therethrough being sized and shaped to receive the positive electrode of the third cylindrical battery cell therethrough and to expose a portion of the negative electrode of the third cylindrical battery cell;

the first busbar layer having a third aperture extending through the second layer portion of the first busbar layer being sized and shaped to receive the positive electrode of the third cylindrical battery cell therethrough, a portion of the first busbar layer proximate to the third aperture being disposed against and electrically contacting the negative electrode of the third cylindrical battery cell;

the intermediate isolation layer having a third aperture extending therethrough being sized and shaped to receive the positive electrode of the third cylindrical battery cell therethrough; and the positive electrode of the third cylindrical battery cell contacting the second layer portion of the second busbar layer, wherein the third cylindrical battery cell is electrically coupled in series with a parallel configuration of the first and second cylindrical battery cells.

7. The battery of claim 6, further comprising:

a fourth cylindrical battery cell having a positive electrode and a negative electrode;

the bottom isolation layer having a fourth aperture extending therethrough being sized and shaped to receive the positive electrode of the fourth cylindrical battery cell therethrough and to expose a portion of the negative electrode of the fourth cylindrical battery cell;

the first busbar layer having a fourth aperture extending through the second layer portion of the first busbar layer being sized and shaped to receive the positive electrode of the fourth cylindrical battery cell therethrough, a portion of the first busbar layer proximate to the fourth aperture being disposed against and electrically contacting the negative electrode of the fourth cylindrical battery cell;

the intermediate isolation layer having a fourth aperture extending therethrough being sized and shaped to receive the positive electrode of the fourth cylindrical battery cell therethrough; and the positive electrode of the fourth cylindrical battery cell contacting the second layer portion of the second busbar layer, wherein the third cylindrical battery cell and the fourth cylindrical battery cell are electrically coupled in parallel with one another.

8. The battery of claim 1, wherein:

the first aperture in the bottom isolation layer has a circular aperture portion and a skirt-shaped aperture portion communicates with the circular aperture portion, the circular aperture portion communicates with the positive electrode of the first cylindrical battery cell, and the skirt-shaped aperture portion communicates with a portion of the negative electrode of the first cylindrical battery cell.

9. The battery of claim 1, further comprising:

a top isolation layer being coupled to the second busbar layer.

10. The battery of claim 9, further comprising:

a sensor layer being coupled to the top isolation layer, the sensor layer having an electrical trace that is electrically coupled to the second busbar layer.

11. A battery, comprising:

a first cylindrical battery cell having a positive electrode and a negative electrode;

a laminated busbar assembly having a bottom isolation layer, a first busbar layer, an intermediate isolation layer, and a second busbar layer;

the first busbar layer being coupled to and between the bottom isolation layer and the intermediate isolation layer;

the intermediate isolation layer being coupled to and between the first busbar layer and the second busbar layer;

the bottom isolation layer having a first aperture extending therethrough being sized and shaped to receive the positive electrode of the first cylindrical battery cell therethrough and to expose a portion of the negative electrode of the first cylindrical battery cell;

the first busbar layer having a first aperture extending therethrough being sized and shaped to receive the positive electrode of the first cylindrical battery cell therethrough, a portion of the first busbar layer proximate to the first aperture thereof being disposed against and electrically contacting the negative electrode of the first cylindrical battery cell;

the intermediate isolation layer having a first aperture extending therethrough being sized and shaped to receive the positive electrode of the first cylindrical battery cell therethrough; and the second busbar layer being disposed against and electrically contacting the positive electrode of the first cylindrical battery cell, the first busbar layer further having a conductive outer side wall that is coupled to and extending perpendicular to a first layer portion thereof, and the second busbar layer further having a conductive outer side wall that is coupled to and extending perpendicular to a second layer portion thereof, and is further coupled to the conductive outer side wall of the first busbar layer.

12. The battery of claim 11, further comprising:

a second cylindrical battery cell having a positive electrode and a negative electrode;

the bottom isolation layer having a second aperture extending therethrough being sized and shaped to receive the positive electrode of the second cylindrical battery cell therethrough and to expose a portion of the negative electrode of the second cylindrical battery cell;

the first busbar layer having a second aperture extending therethrough being sized and shaped to receive the positive electrode of the second cylindrical battery cell therethrough, a portion of the first busbar layer proximate to the second aperture thereof being disposed against and electrically contacting the negative electrode of the second cylindrical battery cell;

the intermediate isolation layer having a second aperture extending therethrough being sized and shaped to receive the positive electrode of the second cylindrical battery cell therethrough; and the second busbar layer being disposed against and electrically contacting the positive electrode of the second cylindrical battery cell, wherein the first and second cylindrical battery cells are electrically coupled in parallel to one another.

13. The battery of claim 12, wherein:

the first busbar layer has the first layer portion and a second layer portion being spaced apart from one another and electrically isolated from one another, the first and second apertures of the first busbar layer being through the first layer portion of the first busbar layer;

the second busbar layer has a first layer portion and the second layer portion being spaced apart from one another and electrically isolated from one another, the positive electrode of the first cylindrical battery cell and the positive electrode of the second cylindrical battery cell contacting the first layer portion of the second busbar layer; and the first layer portion of the first busbar layer is electrically coupled to the second layer portion of the second busbar layer.

14. The battery of claim 11, wherein:

a first busbar is coupled to the conductive outer side wall of the first busbar layer and the conductive outer side wall of the second busbar layer.

15. The battery of claim 13, further comprising:

a third cylindrical battery cell having a positive electrode and a negative electrode;

the bottom isolation layer having a third aperture extending therethrough being sized and shaped to receive the positive electrode of the third cylindrical battery cell therethrough and to expose a portion of the negative electrode of the third cylindrical battery cell;

the first busbar layer having a third aperture extending through the second layer portion of the first busbar layer being sized and shaped to receive the positive electrode of the third cylindrical battery cell therethrough, a portion of the first busbar layer proximate to the third aperture being disposed against and electrically contacting the negative electrode of the third cylindrical battery cell;

the intermediate isolation layer having a third aperture extending therethrough being sized and shaped to receive the positive electrode of the third cylindrical battery cell therethrough; and the positive electrode of the third cylindrical battery cell contacting the second layer portion of the second busbar layer, wherein the third cylindrical battery cell is electrically coupled in series with a parallel configuration of the first and second cylindrical battery cells.

16. The battery of claim 15, further comprising:

a fourth cylindrical battery cell having a positive electrode and a negative electrode;

the bottom isolation layer having a fourth aperture extending therethrough being sized and shaped to receive the positive electrode of the fourth cylindrical battery cell therethrough and to expose a portion of the negative electrode of the fourth cylindrical battery cell;

the first busbar layer having a fourth aperture extending through the second layer portion of the first busbar layer being sized and shaped to receive the positive electrode of the fourth cylindrical battery cell therethrough, a portion of the first busbar layer proximate to the fourth aperture being disposed against and electrically contacting the negative electrode of the fourth cylindrical battery cell;

the intermediate isolation layer having a fourth aperture extending therethrough being sized and shaped to receive the positive electrode of the fourth cylindrical battery cell therethrough; and the positive electrode of the fourth cylindrical battery cell contacting the second layer portion of the second busbar layer, wherein the third cylindrical battery cell and the fourth cylindrical battery cell are electrically coupled in parallel with one another.

17. The battery of claim 11, wherein:

the first aperture in the bottom isolation layer has a circular aperture portion and a skirt-shaped aperture portion communicates with the circular aperture portion, the circular aperture portion communicates with the positive electrode of the first cylindrical battery cell, and the skirt-shaped aperture portion communicates with a portion of the negative electrode of the first cylindrical battery cell.

18. The battery of claim 11, further comprising:

a top isolation layer being coupled to the second busbar layer.

19. The battery of claim 18, further comprising:

a sensor layer being coupled to the top isolation layer, the sensor layer having an electrical trace that is electrically coupled to the second busbar layer.

* * * * *